(12) United States Patent
Kang

(10) Patent No.: US 12,148,321 B2
(45) Date of Patent: Nov. 19, 2024

(54) DEVICE AND METHOD FOR PROVIDING VISUAL ABILITY TRAINING USING VISUAL PERCEPTUAL LEARNING

(71) Applicant: NUNAPS INC., Seoul (KR)

(72) Inventor: Dong Wha Kang, Seoul (KR)

(73) Assignee: NUNAPS INC., Seoul (KR)

( * ) Notice: Subject to any disclaimer, the term of this patent is extended or adjusted under 35 U.S.C. 154(b) by 0 days.

(21) Appl. No.: 17/931,417

(22) Filed: Sep. 12, 2022

(65) Prior Publication Data

US 2023/0033982 A1 Feb. 2, 2023

Related U.S. Application Data

(63) Continuation of application No. PCT/KR2021/002970, filed on Mar. 10, 2021.

(30) Foreign Application Priority Data

Mar. 13, 2020 (KR) .................. 10-2020-0031094

(51) Int. Cl.
*G09B 5/02* (2006.01)
*A61H 5/00* (2006.01)

(52) U.S. Cl.
CPC .............. *G09B 5/02* (2013.01); *A61H 5/00* (2013.01); *A61H 2201/5043* (2013.01)

(58) Field of Classification Search
CPC .......... G09B 5/02; G09B 7/02; G09B 21/008; A61H 5/00; A61H 2201/5043; A61H 1/00;

(Continued)

(56) References Cited

U.S. PATENT DOCUMENTS

| 6,364,845 B1* | 4/2002 | Duffy ................. A61B 5/165 351/200 |
| 2003/0223038 A1* | 12/2003 | Alster ................. A61B 3/02 351/211 |

(Continued)

FOREIGN PATENT DOCUMENTS

| JP | 2005-516679 A | 6/2005 |
| JP | 2007-527738 A | 10/2007 |

(Continued)

OTHER PUBLICATIONS

International Search Report issued in PCT/KR2021/002970; mailed Jun. 30, 2021.

*Primary Examiner* — Jack Yip
(74) *Attorney, Agent, or Firm* — Studebaker & Brackett PC

(57) ABSTRACT

The present invention relates to a method for providing visual perception training using visual perception learning, the method comprising the steps of: obtaining a field-of-view map having a plurality of unit regions to which a vision index reflecting a user's vision ability is assigned; providing a first session using a visual perception task which is performed by displaying a first visual object for central fixation of the user's field of view and a second visual object in the vicinity of the first visual object, and requests the user's response related to at least the second visual object; determining a vision ability changed region among the plurality of unit regions on the basis of the user's response from the first session; and providing a second session using the visual perception task.

20 Claims, 22 Drawing Sheets

(58) Field of Classification Search
CPC ........ A61H 5/005; A61B 3/024; A61M 21/00; A61M 2021/0044
See application file for complete search history.

(56) References Cited

U.S. PATENT DOCUMENTS

| | | | |
|---|---|---|---|
| 2004/0136570 A1* | 7/2004 | Ullman | G06T 5/75 382/114 |
| 2007/0121070 A1* | 5/2007 | Alster | A61B 3/024 351/224 |
| 2007/0166675 A1* | 7/2007 | Atkins | G09B 7/04 434/236 |
| 2007/0166676 A1* | 7/2007 | Bird | G09B 7/04 434/236 |
| 2007/0200927 A1* | 8/2007 | Krenik | A61B 3/0033 348/47 |
| 2008/0024725 A1* | 1/2008 | Todd | A61B 3/0091 351/222 |
| 2008/0212032 A1* | 9/2008 | Seiller | G09B 19/0038 351/222 |
| 2010/0141894 A1* | 6/2010 | Sahraie | A61B 3/0041 351/203 |
| 2010/0201942 A1* | 8/2010 | Hess | H04N 13/327 351/203 |
| 2015/0320306 A1 | 11/2015 | Voigtmann et al. | |
| 2016/0270656 A1* | 9/2016 | Samec | A61B 3/1015 |
| 2018/0136486 A1* | 5/2018 | Macnamara | A61B 3/13 |
| 2022/0151489 A1* | 5/2022 | Khan | A61B 3/102 |
| 2023/0336703 A1* | 10/2023 | Tavakkoli | G16H 30/20 |

FOREIGN PATENT DOCUMENTS

| | | |
|---|---|---|
| KR | 10-2015-0118242 A | 10/2015 |
| KR | 10-2018-0034278 A | 4/2018 |

* cited by examiner

FIG. 5

|     |     |     | -20 | -30 |     |     |     |
| --- | --- | --- | --- | --- | --- | --- | --- |
|     |     | -10 | -10 | -30 | -30 |     |     |
|     | 0   | 0   | 0   | -30 | -30 | -30 |     |
| -20 | 0   | 0   | 0   | -30 | -30 | -30 | -30 |
| 0   | 0   | 0   | -10 | -30 | -30 | -30 | -30 |
|     | 0   | 0   | 0   | -30 | -30 | -30 |     |
|     |     | -10 | 0   | -30 | -30 |     |     |
|     |     |     | -10 | -30 |     |     |     |

First session → Second session

DEVICE AND METHOD FOR PROVIDING VISUAL ABILITY TRAINING USING VISUAL PERCEPTUAL LEARNING

CROSS-REFERENCE TO RELATED APPLICATIONS

The present application is a continuation of International Patent Application No. PCT/KR2021/002970, filed on Mar. 10, 2021, which is based upon and claims the benefit of priority to Korean Patent Application No. 10-2020-0031094 filed on Mar. 13, 2020. The disclosures of the above-listed applications are hereby incorporated by reference herein in their entirety.

BACKGROUND

The inventive concept relates to a device and method for providing visual perceptual training, and more particularly, to a device and method for providing visual perceptual training using visual perceptual learning.

Recently, as more patients are suffering from brain-related diseases including stroke, interest in visual field defect due to brain function impairment is increasing. For example, when a patient with impaired function of the left visual cortex opens both eyes and looks to the front, a visual field defect occurs in the right visual field to cause hemi-blindness with the inability to recognize objects. There is a study report reporting that the perception for movement is improved after five adults with damaged primary visual cortex have been subjected to visual perceptual learning to treat these visual field defects. (Huxlin et al. J Neurosci 2009)

Accordingly, conventionally, treatment for visual field defect has been performed in such a way that a stimulus is repeatedly applied to the peripheral area of a patient's visual field and the patient provides reaction when recognizing the stimulus. However, there is a problem in that the patient is only accustomed to the conventional treatment method that is repeatedly performed, and the treatment effect is lowered because visual perceptual learning is not achieved on the patient.

Therefore, there is a need to develop a technology for providing a visual perceptual training that is actually used to improve the patient's cognitive ability in such a way that patients actually perform visual perceptual learning.

SUMMARY

An object of the inventive concept is to provide a device and method for providing visual perceptual training using visual perceptual learning to identify visual objects.

An object of the inventive concept is to provide a device and method for providing visual perceptual training, which control the frequency of training of a region, in which a vision ability is improved or deteriorated, through visual perceptual learning.

The problem to be solved by the inventive concept is not limited to the above-mentioned problems, and the problems not mentioned will be clearly understood by those of ordinary skill in the art to which the inventive concept belongs from the present specification and the accompanying drawings.

According to the inventive concept, a method for providing visual perceptual training using visual perceptual learning, the method being performed by a device for providing visual perceptual training, includes obtaining a visual field map having a plurality of unit regions to which a vision index reflecting a user's vision ability is assigned, displaying a first visual object for central fixation of a user's visual field and at least one second visual object around the first visual object, providing a first session using a visual perceptual task for requesting a response related to the second visual object from the user, determining a vision ability-changed region among the plurality of unit regions based on the response of the user from the first session, and providing a second session using the visual perceptual task, wherein the second session displays the second visual object at a location corresponding to the vision ability-changed region more frequently than at locations corresponding to remaining regions of the plurality of unit regions.

The response of the user may be related to an attribute of the second visual object, and the attributes of the second visual object may include at least one of existence or absence, contrast, size, shape, color, display time, brightness, movement, rotation, pattern, and depth.

The response of the user may be as to whether the attributes of the first visual object and the second visual object are the same.

The second visual object may be displayed more number of times at a second location corresponding to a second unit region in which a change in vision ability is larger than that of a first unit region, as compared to a first location corresponding to the first unit region among the user's vision ability-changed regions, and the first location may be different from the second location.

The vision ability-changed region may be determined as a region in which the vision index changes by more than a predetermined value among the plurality of unit regions.

The vision ability-changed region may include at least one of a vision ability-improved region reflecting improvement of the user's vision ability and a vision ability-deteriorated region reflecting deterioration of the user's vision ability, and the second visual object in the second session may be displayed more number of times at a location corresponding to the vision ability-deteriorated region, compared to at a location corresponding to the vision ability-improved region.

The visual perceptual task may request an additional response related to the first visual object from the user, the additional response may relate to an attribute of the first visual object, and the attributes of the first visual object may include at least one of existence or absence, contrast, size, shape, color, display time, brightness, movement, rotation, pattern, and depth.

The obtaining of the visual field map may include providing an evaluation session using the visual perceptual task, the generating the visual field map based on the evaluation session, and the visual field map may be generated based on whether a response related to the second visual object is correct in the evaluation session.

Further, a first vision index may be assigned to a first unit region having a first correct rate with respect to a response related to the second visual object, a second vision index may be assigned to a second unit region having a second correct rate greater than the first correct rate with respect to a response related to the second visual object, and the second vision index may reflect a higher vision ability than the first vision index.

Further, a device for providing visual perceptual training using visual perceptual learning includes a display, an input module that obtains a signal corresponding to an input of a user, and a controller that controls an operation related to the visual perceptual training using the visual perceptual learning, wherein the controller may obtain a visual field map having a plurality of unit regions to which a vision index reflecting a user's vision ability is assigned, allow the display to display a first visual object for central fixation of a user's visual field and at least one second visual object around the first visual object, provide a first session using a visual perceptual task for requesting a response related to the second visual object from the user, determine a vision ability-changed region among a plurality of unit regions based on the response of the user obtained through the input module from the first session, and provide a second session using the visual perceptual task, wherein the second session displays the second visual object at a location corresponding to the vision ability-changed region more frequently than at locations corresponding to remaining regions of the plurality of unit regions.

The solutions to be solved by the inventive concept is not limited to the above-mentioned solutions, and the solutions not mentioned will be clearly understood by those of ordinary skill in the art to which the inventive concept belongs from the present specification and the accompanying drawings.

BRIEF DESCRIPTION OF THE FIGURES

The above and other objects and features will become apparent from the following description with reference to the following figures, wherein like reference numerals refer to like parts throughout the various figures unless otherwise specified, and wherein:

FIGS. 4 and 5 are examples of a visual field map according to an embodiment;

DETAILED DESCRIPTION

Figure 1:
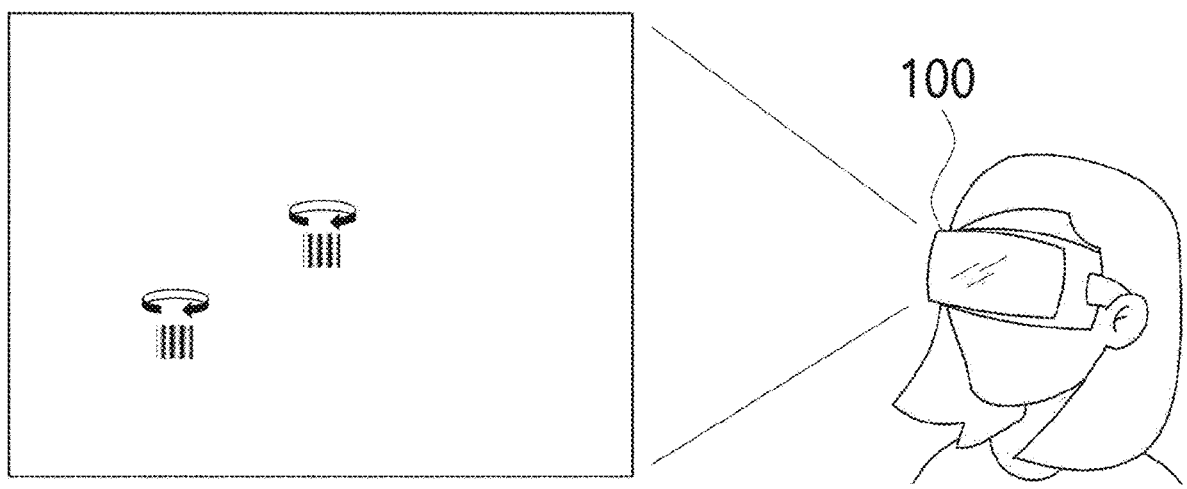
FIG. 1 is a diagram illustrating a state in which a visual perceptual task is provided to a device for providing visual perceptual training according to an embodiment.

Advantages and features of the inventive concept and methods for achieving them will be apparent with reference to embodiments described below in detail in conjunction with the accompanying drawings. However, the inventive concept is not limited to the embodiments disclosed below, but can be implemented in various forms, and these embodiments are to make the disclosure of the inventive concept complete, and are provided so that this disclosure will be thorough and complete and will fully convey the scope of the invention to those of ordinary skill in the art, which is to be defined only by the scope of the claims.

The terminology used herein is for the purpose of describing particular embodiments only and is not intended to be limiting of the inventive concept. The singular expressions include plural expressions unless the context clearly dictates otherwise. In this specification, the terms "comprises" and/or "comprising" are intended to specify the presence of stated elements, but do not preclude the presence or addition of elements. Like reference numerals refer to like elements throughout the specification, and "and/or" includes each and all combinations of one or more of the mentioned elements. Although "first", "second", and the like are used to describe various components, these components are of course not limited by these terms. These terms are only used to distinguish one component from another. Thus, a first element discussed below could be termed a second element without departing from the teachings of the inventive concept.

As used herein, the word "exemplary" means "serving as an example, instance, or illustration." Any implementation described herein as exemplary is not necessarily to be construed as preferred or advantageous over other implementations.

The term "unit, as used herein, means, but is not limited to, a software or hardware component, such as a Field Programmable Gate Array (FPGA) or an Application Specific Integrated Circuit (ASIC), which performs certain tasks. However, "~ unit" is not meant to be limited to software or hardware. "A unit" may be configured to reside in an addressable storage medium or may be configured to reproduce one or more processors. As an example, "~ unit" may include components such as software components, object-oriented software components, class components and task components, processes, functions, attributes, procedures, sub-routines, segments of program codes, drivers, firmware, microcodes, circuitry, data, databases, data structures, tables, arrays, and variables. The functionality provided within elements and "parts" may be combined into a smaller number of elements and "parts" or further separated into additional elements and "parts."

Further, in this specification, all "units" may be controlled by at least one processor, and at least one processor may perform operations performed by "units" of the present disclosure.

Embodiments of the present specification may be described in terms of a function or a block performing a function. These blocks, which may be referred to herein as units or modules or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and/or software.

Embodiments of the present specification may be implemented using at least one software program running on at least one hardware device and may perform a network management function to control an element.

Unless otherwise defined, all terms (including technical and scientific terms) used herein have the same meaning as commonly understood by one of ordinary skill in the art to which this invention belongs. It will be further understood that terms such as those defined in commonly used dictionaries, will not be interpreted in an idealized or overly formal sense unless expressly so defined herein.

Spatially relative terms, such as "below", "beneath", "lower", "above", and "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. Components may also be oriented in other orientations, and thus spatially relative terms may be interpreted according to orientations.

As used herein, perceptual learning refers to learning to improve the perception of a stimulus with repetitive exposure to the same stimulus. In other words, in the present specification, the visual perceptual learning refers to learning to improve the perception of a visual stimulus through repetitive training that provides the visual stimulus. As a result of visual perceptual learning, learners can see things that they have not seen before or notice differences that they could not distinguish before. Visual perceptual learning should be broadly interpreted to include learning to improve the ability to identify objects from stimuli incoming from the outside through the visual organ, as well as learning to improve the ability to discover objects from the stimuli.

In the present specification, the visual field deficit means a disorder of the visual system from the retina to the cerebral cortex or an abnormality of the visual field. For example, visual field deficit should be broadly interpreted to include visual field defects due to death (or dysfunction) of retinal ganglion cells as well as visual field defects due to damage to brain function.

As used herein, "training" refers to any action in which the visual field defect symptom is improved or is beneficially changed. For example, but not limited to, training may be a measure to obtain effects such as suppressing the progression of visual field deficit, reducing the rate of progression of visual field defects, stopping progression of visual field deficit, and improving visual field deficit.

As used herein, the expression "task" may refer to a goal and/or purpose to be achieved by a user. For example, a computerized task may be rendered using computerized components, and a user may be instructed as to a goal or purpose for performing the computerized task. A task may require an individual to provide or withhold a response to a particular stimulus.

As used herein, the expression "session" may refer to a time period, having a beginning and an end, during which a user interacts with a device to receive training from the device. For example, a session may be 1 second, 30 seconds, 1 minute, 1 hour, 12 hours, a day, a week, a month, or the like. Hereinafter, a device for providing visual perceptual training and a method for providing visual perceptual training will be described.

FIG. 1 is a diagram illustrating a state in which a visual perceptual task is provided to a device for providing visual perceptual training according to an embodiment.

Referring to FIG. 1, a device 100 for providing visual perceptual training may provide a visual perceptual task for training for a visual field defect.

The visual cortex is a region located in the occipital lobe directly involved in visual information processing within the cerebral cortex, and the sensory regions of the cerebral cortex receive and process signals from sensory organs including body sensory such as touch and pain, and sight, hearing, taste, and smell to allow the sensory to be recognized and perceived. When there is a problem in one of these pathways, perception of a relevant sensory may become impossible.

Specifically, in the process of a person's recognition of a sensory stimulus (e.g., a visual stimulus), a sensory stimulus (e.g., a visual stimulus) is input to a sensory organ (e.g., an eye) to perform sensation, and the sensory area of the cerebrum (e.g., the visual cortex) performs perception to perform the recognition of deriving meaning by associating sensory representations (e.g., visual representations) with memory representations.

In this case, when the sensory organ of a person with the damaged visual cortex receives the visual stimulus, there is no abnormality in the sensory process of the sensory organ, but the brain may not perceive the visual stimulus and thus the person may not see an object. For example, in patients with visual field impairment due to brain damage, visual cortex abnormalities may occur, resulting in visual field deficit in which some region of the visual field cannot be seen.

However, in a person with a partially damaged visual cortex, the role of the damaged brain cells can be partially replaced by the intact brain cells, so that the visual function can be restored, which is called neuroplasticity.

As a method for promoting such neuroplasticity, visual perceptual learning that continuously provides stimulation to brain cells (e.g., damaged brain cells) may be used. Accordingly, the device 100 for providing visual perceptual training may provide training for a visual field deficit by providing a visual perceptual task for visual perceptual learning.

According to an embodiment, the device 100 for providing visual perceptual training may provide a screen for a visual perceptual task in which a visual object for gaze fixation is displayed, and another visual object is displayed in an area around the visual object. Here, the device 100 for providing visual perceptual training may provide a visual perceptual task and receive a patient response related to the visual object from a user. For example, the apparatus 100 for providing visual perceptual training may display a visual object rotating in a specific direction and receive a response from a patient related to the rotation direction of the visual object.

Figure 2:
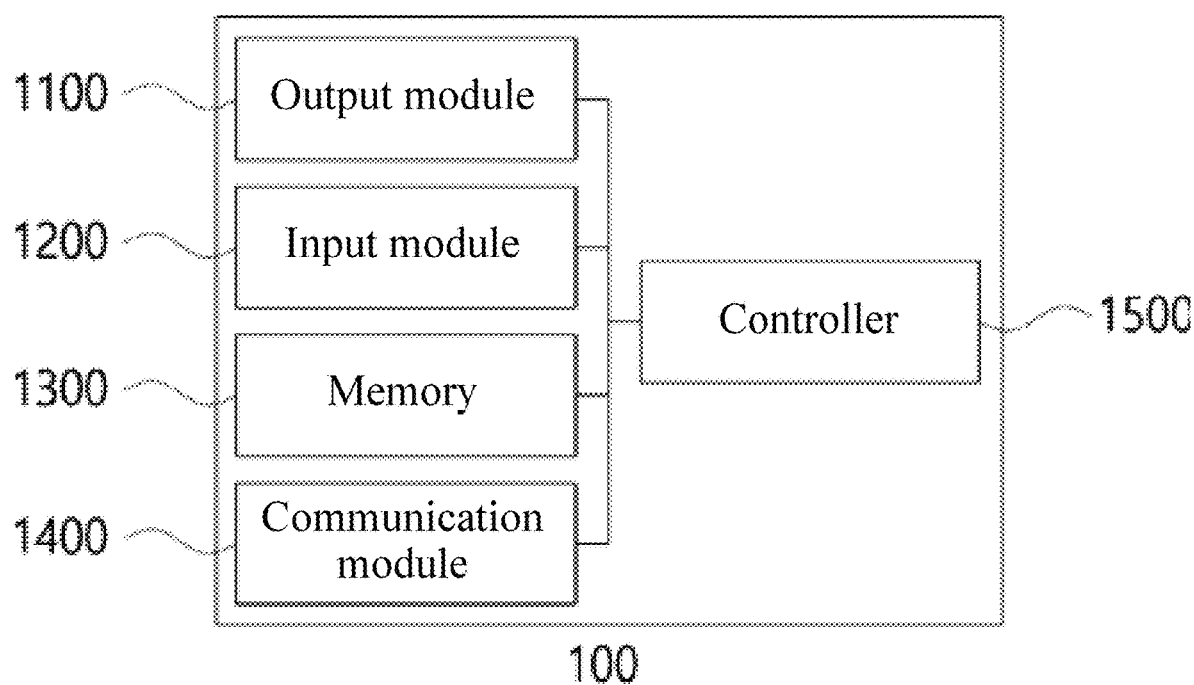
FIG. 2 is a block diagram of a configuration of a device for providing visual perceptual training according to an embodiment.

FIG. 2 is a block diagram of a configuration of an apparatus for providing visual perceptual training according to an embodiment.

Referring to FIG. 2, the device 100 for providing visual perceptual training may include an output module 1100, an input module 1200, a memory 1300, a communication module 1400, and a controller 1500.

The device 100 for providing visual perceptual training may include various devices capable of performing computational processing. For example, the apparatus 100 for providing visual perceptual training may include a desktop PC, a mobile phone, a smart phone, a laptop computer, personal digital assistants (PDA), a portable multimedia player (PMP), a slate PC, a tablet PC, an ultrabook, a wearable device, and the like.

According to an embodiment, the device 100 for providing visual perceptual training may be worn on any part of the body and used in such a way that the output module 1100 faces a user's eyes. For example, the device 100 for providing visual perceptual training may include a head mounted device, such as a head mounted display (HMD) mounted on a user's head to display a video, smart glasses, and smart goggles, or a display device such as a mobile phone used while mounted on a head-mounted device, or the like.

The output module 1100 may output a video or an image. For example, the output module 1100 may include an LCD, an OLED, an AMOLED display, and the like. Here, when the output module 1100 is provided as a touch screen, the output module 1110 may perform the function of the input module 1200. In this case, the separate input module 1200 may not be provided according to selection, and the input module 1200 capable of performing limited functions such as volume control, power button, and home button may be provided. As another example, the output module 1100 may be provided in the form of an image output port for transmitting image information to an external display device.

According to an embodiment, the screen of the output module 1100 may include a first display unit corresponding to the left eye of a patient and a second display unit corresponding to the right eye of the patient. Here, the first display unit may output a first image, and the second display unit may output a second image. The controller 1500 may adjust the distance between the first image and the second image, the degree of overlap, and the like to adjust the parallax, focus, or the like of the image provided to a user.

Also, the output module 1100 may display an image for visual perceptual learning of a user. For example, the output module 1100 may visually output a process before starting a visual perceptual task, an instruction, an image for performing the visual perceptual task, and the like.

Also, the output module 1100 may output information to be provided to the user in various ways. For example, the output module 1100 may include a speaker, a motor, a haptic device, a vibrator, a signal output circuit, and the like, and may be a module that outputs various stimuli.

Also, the output module 1100 may audibly or tactilely output information for the visual perceptual task. Specifically, the output module 1100 may output an alarm indicating the start and end of a training session in an audible or tactile manner.

According to an embodiment, the output module 1100 may output a stimulus for other perceptual learning (e.g., auditory perceptual learning). For example, the output module 1100 may output, but not limited thereto, an auditory stimulus for auditory perceptual learning. Specifically, the output module 1100 may output an instruction for informing a rule related to an auditory perceptual task, an auditory stimulus for the auditory perceptual task, and the like.

The input module 1200 may obtain a signal corresponding to a user input. For example, the input module 1200 may receive a user input for performing a visual perceptual task, a user input for adjusting the focus of an image for a visual perceptual task during visual perceptual learning, and a user input for receiving a user response requested by the visual perceptual task, or the like.

Also, the input module 1200 may include a keyboard, a key pad, a button, a jog shuttle, a wheel, and the like. In addition, the user input in the input module 1200 may be, for example, a press of a button, a touch, and a drag. Also, when the output module 1100 is implemented with a touch screen, the output module 1100 may serve as the input module 1200.

According to an embodiment, the input module 1200 may be configured as a separate module connected to the device 100 wirelessly or by wire. For example, the device 100 may provide an image for a visual perceptual task to a user through the output module 1100 mounted on and attached to the user's head, and receive an input for a visual perceptual task from the user through the input module 1200 configured as a separate module given to the user's hand.

The memory 1300 may store various types of data. For example, the memory 1300 may store data related to a visual perceptual task. Specifically, the memory 1300 may store a program for executing a visual perceptual task, user information (e.g., user personal information, a user's response when a task is performed, the result of a user's visual perceptual task), data related to a user's visual field map, and the like.

Also, the memory 1300 may include at least one type of storage medium among a flash memory type, a hard disk type, a multimedia card microtype, a card type memory (e.g., SD or XD memory), random access memory (RAM), static random access memory (SRAM), read-only memory (ROM), electrically erasable programmable read-only memory (EEPROM), programmable read-only memory (PROM), magnetic memory, magnetic disk, and optical disk. In addition, the memory 1300 may temporarily, permanently, or semi-permanently store information, and may be provided as a built-in or removable type.

The communication module 1400 may communicate with an external device. For example, the communication module 1400 may communicate with a server (not shown). Specifically, the communication module 1400 may transmit data related to a user's visual perceptual task to the server, and may receive a personalized feedback therefor from the server.

Also, the communication module 1400 may perform communication according to wired and wireless communication standards. For example, the communication module 1400 may include a mobile communication module for BLE (Bluetooth Low Energy), Bluetooth, WLAN (Wireless LAN), WiFi (Wireless Fidelity), WiFi Direct, NFC (Near Field Communication), Infrared Data Association (IrDA), UWB (Ultra Wide Band), Zigbee, 3G, 4G or 5G, and a wired/wireless module for transmitting data through various other communication standards.

The controller 1500 may control each component of the device 100 for providing visual perceptual training or process and calculate various types of information. For example, the controller 1500 may output an image for the visual perceptual task through the output module 1100. Specifically, the controller 1500 may determine the position of a visual object on the output module 1100 in a visual perceptual task based on an acquired user's visual field map, and display the visual object at a position determined through the output module 1100.

The controller 1500 may be implemented by software, hardware, or a combination thereof. For example, in hardware, the controller 1500 may be implemented with a field programmable gate array (FPGA), an application specific integrated circuit (ASIC), a semiconductor chip, or other various types of electronic circuits. Also, for example, in software, the controller 1500 may be implemented in a logic program executed according to the above-described hardware or in various computer languages.

In the following description, unless otherwise stated, it may be understood that the operation of the device 100 for providing visual perceptual training is performed under the control of the controller 1500.

The device 100 for providing visual perceptual training shown in FIG. 2 is merely an example, and the configuration of the device 100 for providing visual perceptual training is not limited thereto, and the function performed by each component of the device 100 for providing visual perceptual training is not necessarily performed by the corresponding component and may be performed by another component. For example, although it has been described that the memory 1300 of the device 100 for providing visual perceptual training stores data related to the user's visual perceptual task, a server connected to the device 100 for providing visual perceptual training through wired/wireless communication may store data related to the visual perceptual task of a user.

Figure 3:
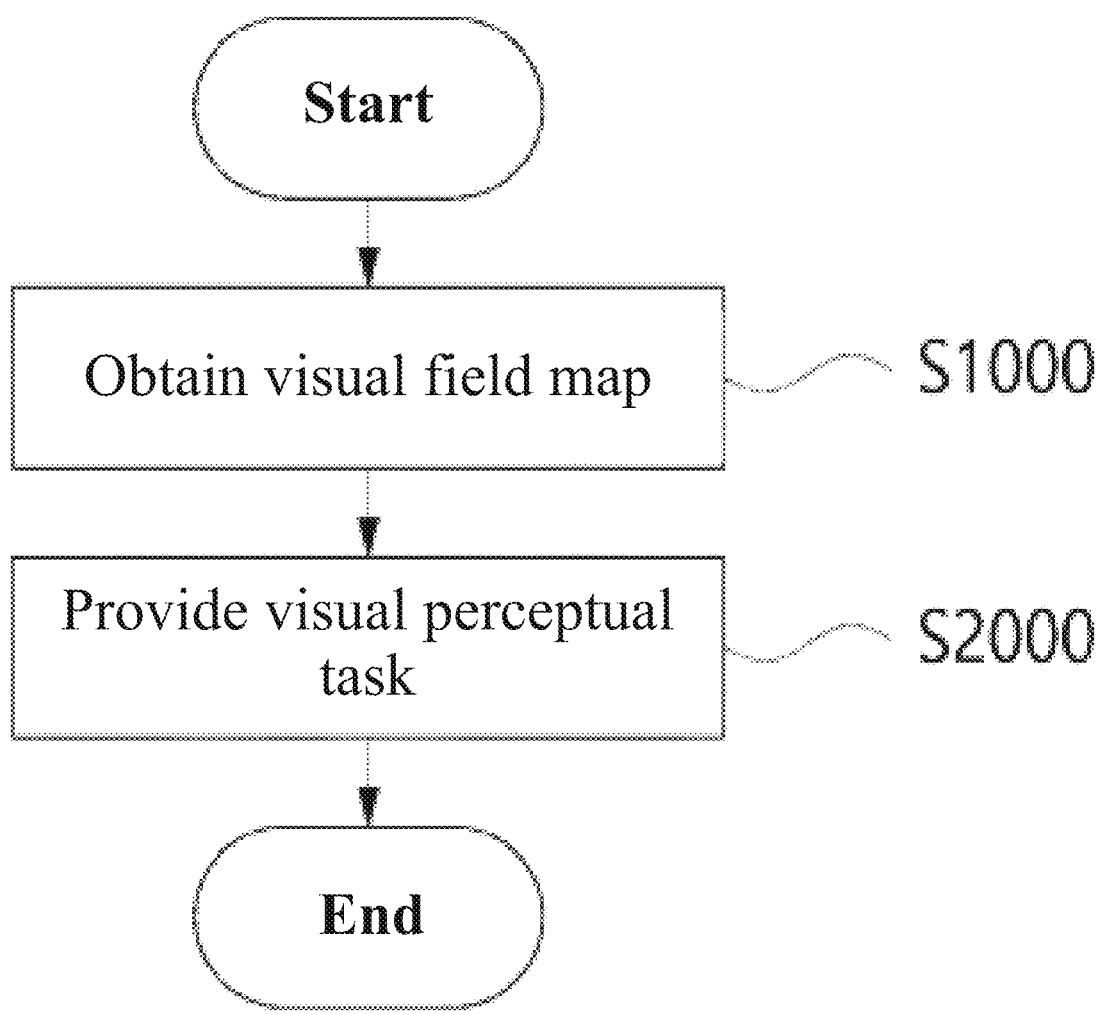
FIG. 3 is a flowchart of a method for providing visual perceptual training according to an embodiment.

FIG. 3 is a flowchart of a method for providing visual perceptual training according to an embodiment.

Referring to FIG. 3, a method for providing visual perceptual training according to an embodiment may include obtaining a visual field map (S1000) and providing a visual perceptual task (S2000).

The device 100 for providing visual perceptual training may obtain a user's visual field map (S1000). For example, the device 100 for providing visual perceptual training may obtain a visual field map of at least one of both eyes of a user.

The visual field map is a map indicating the user's visual field range and vision ability. For example, the visual field map may include a plurality of unit regions to which a vision index reflecting the user's vision ability is assigned. Specifically, the visual field map may include at least one of a normal region and a defect region.

The vision index is for classifying the user's vision ability, and may be any parameter reflecting the user's vision ability, such as a vision ability score. For example, when the vision index is in the form of a score, the vision index may have a smaller value as the vision ability is worse.

According to an embodiment, in the visual field map, the regions may be distinguished based on the vision indexes. For example, the vision index may be used to determine the defect region in the visual field map. Specifically, a region to which a vision index in a preset range is assigned may be determined as the defect region. As another example, the vision index may be used to determine whether a vision ability-changed region exists in the visual field map. Specifically, in the visual field map, a region in which the assigned vision index changes over time may be determined as the vision ability-changed region.

Of course, when the vision index is in the form of a score, the vision index may be used to classify the regions of the visual field map in various ways, such as in such a way that a region to which a vision index lower than a preset value is assigned is determined as the defect region.

Figure 4:
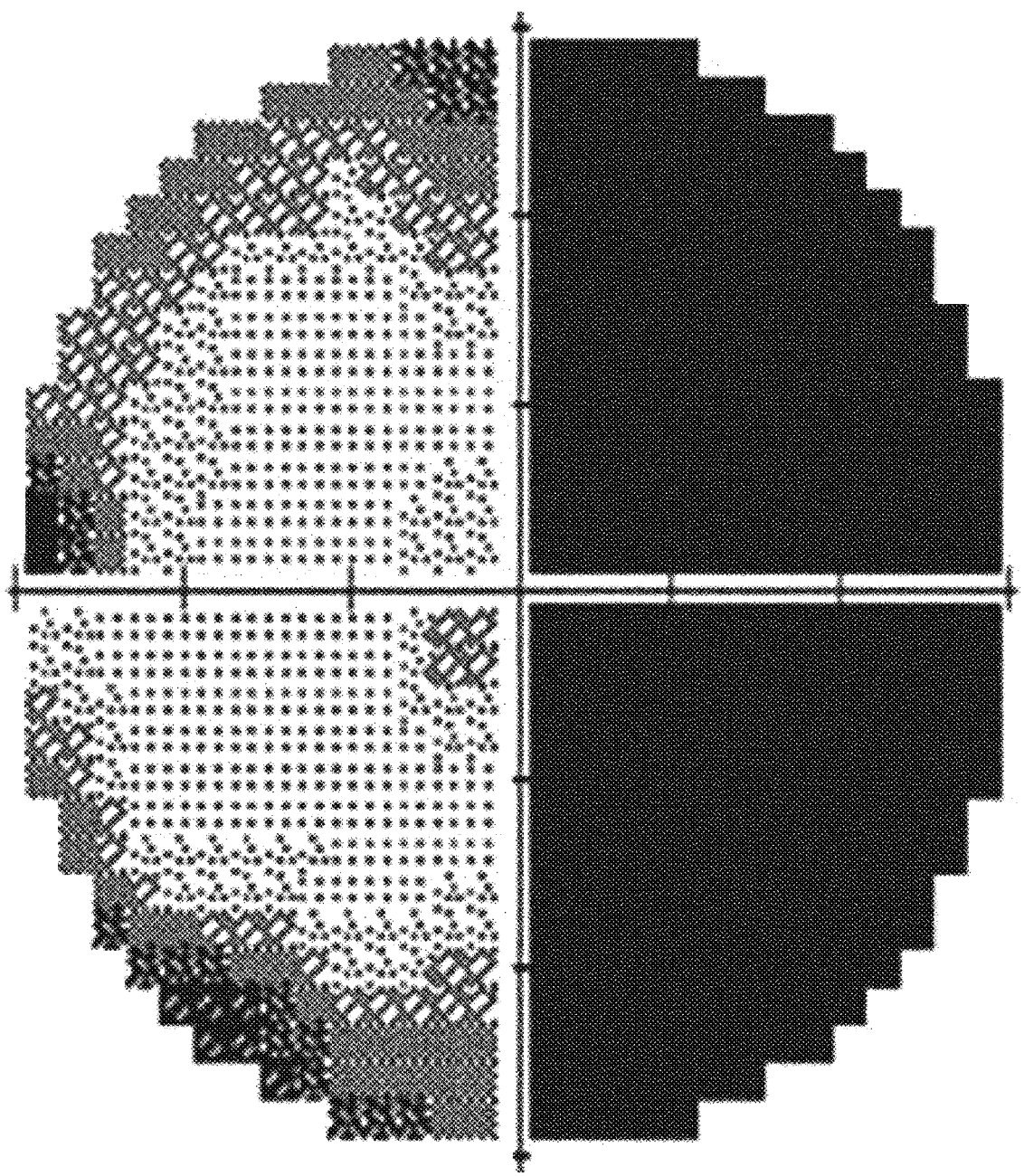

FIGS. 4 and 5 are examples of a visual field map according to an embodiment.

Referring to FIG. 4, a vision index displayed darker as the vision ability is worse may be assigned to a plurality of unit regions of the visual field map.

The visual field map may have a plurality of unit regions to which vision indexes are assigned respectively. Each region of the visual field map may be assigned a vision index that is displayed darker as the vision ability is worse.

On the visual field map to which the vision index as described above is assigned, a dark region may be a defect region, and a bright region may be a normal region.

For example, a region brighter than a preset brightness on the visual field map may be a normal region, and a region darker than the preset brightness on the visual field map may be a defect region. Specifically, a gray region of the visual field map may be a defect region like the dark region, or may be determined as a normal region, according to a preset brightness.

Referring to FIG. 5, a vision index given a lower score as the vision ability is worse may be assigned to a plurality of unit regions of the visual field map.

On the visual field map to which the vision index is assigned, a region with a low score may be a defect region, and a region with a high score may be a normal region. For example, a region to which a score higher than a preset score is assigned on the visual field map may be a normal region, and a region to which a score lower than the preset score is assigned on the visual field map may be a defect region. Referring to FIG. 5, when the preset score is —20, a region assigned a score lower than ~20 on the visual field map may be a defect region.

Of course, when the vision index is in the form of a score, the regions of the visual field map may be divided in various ways, such as in such a way that a region to which a vision index lower than a preset value is assigned is determined as a defect region. In addition, the visual field map is not limited to a circle-shaped visual field map, and may be implemented as a different form of visual field map, such as a visual field map of a different shape, such as a rectangle or a hexagon, which is not a circle shape.

According to an embodiment, the device 100 for providing visual perceptual training may match the acquired visual field map with a screen output through the output module 1100.

Figure 6B:
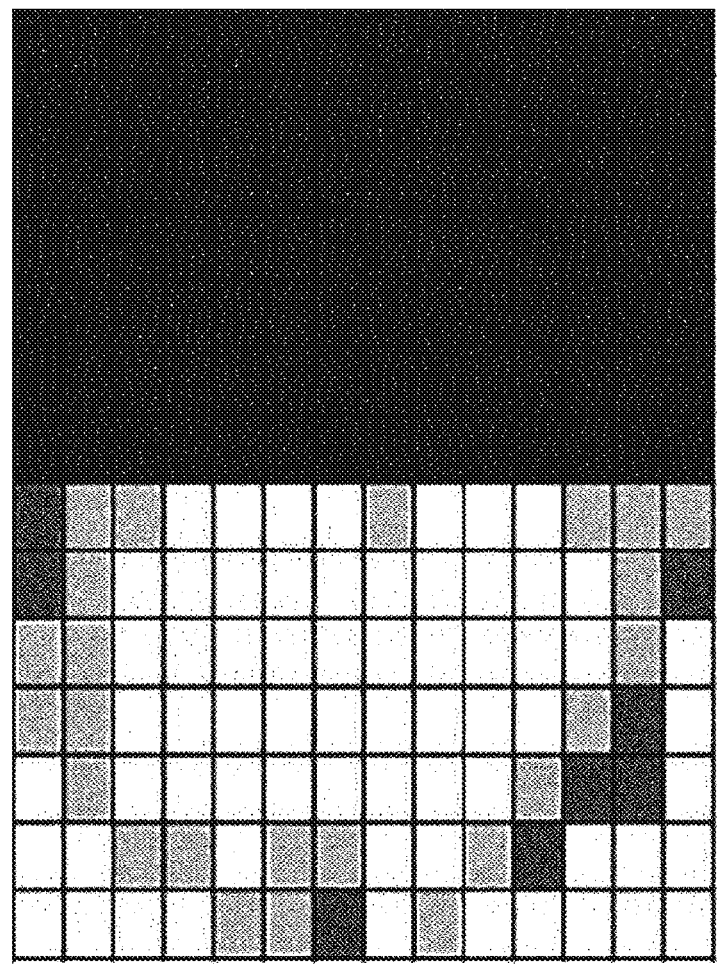
FIGS. 6A and 6B are diagrams illustrating a correspondence relationship between a visual field map and an output screen according to an embodiment.
Figure 6A:
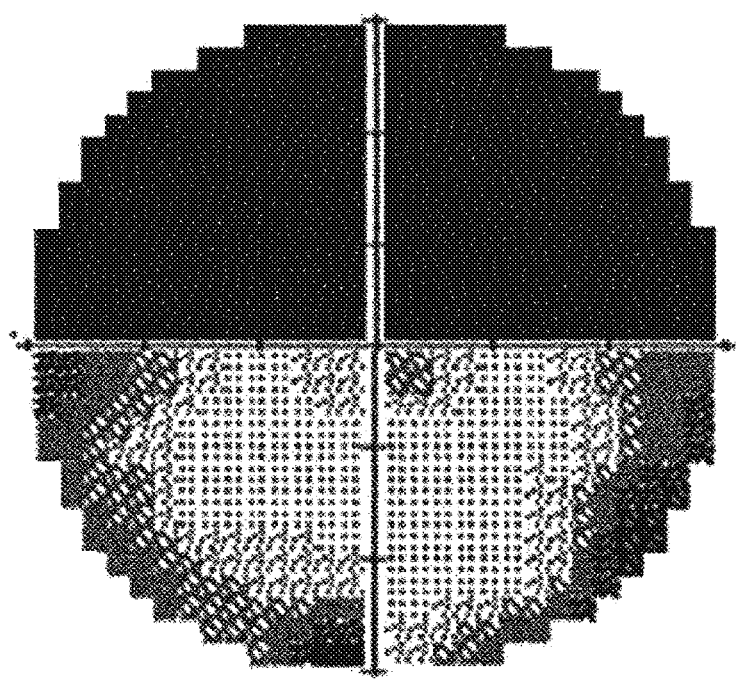

FIGS. 6A and 6B are diagrams illustrating a correspondence relationship between a visual field map and an output screen according to an embodiment.

FIG. 6A is a view showing a visual field map obtained by the device 100 for providing visual perceptual training, and FIG. 6B is a view showing an output screen corresponding to the visual field map of FIG. 6A. Referring to FIGS. 6A and 6B, the device 100 for providing visual perceptual training may match the acquired visual field map with a screen output through the output module 1100. For example, the controller 1500 may obtain a visual field map, and map the obtained visual field map and an output screen to each other.

Accordingly, the device 100 for providing visual perceptual training may display a visual object through the output module 1100 at a position corresponding to a specific region of the visual field map when providing a visual perceptual task based on the visual field map.

According to an embodiment, the device 100 for providing visual perceptual training may obtain a visual field map based on a result of a visual field test for a user. For example, the controller 1500 may obtain a result of a separate visual field test for the user, and generate a visual field map having a plurality of unit regions to which vision indexes reflecting the user's vision ability are respectively assigned based on the result.

Here, the visual field test may include, but is not limited to, a static visual field test or a dynamic visual field test. For example, the visual field test may be a Goldmann visual field test, a Humphrey visual field test, and the like. To this end, the device 100 for providing visual perceptual training may obtain the result of the visual field test for the user, which is generated from a separate visual field tester or from a visual field tester included in the device 100 for providing visual perceptual training.

In addition, the step of obtaining the visual field map (S1000) may include generating, by the device 100 for providing visual perceptual training, information related to the visual field map. For example, the controller 1500 may generate a table including data regarding a plurality of unit regions of the visual field map, a vision index, and the like.

According to an embodiment, the device 100 for providing visual perceptual training may obtain a visual field map by providing an evaluation session using a visual perceptual task. For example, the controller 1500 may display a visual stimulus (e.g., a visual object) in various unit regions on the output module 1100 and obtain a visual field map based on a response received from the user for each unit region.

Figure 7:
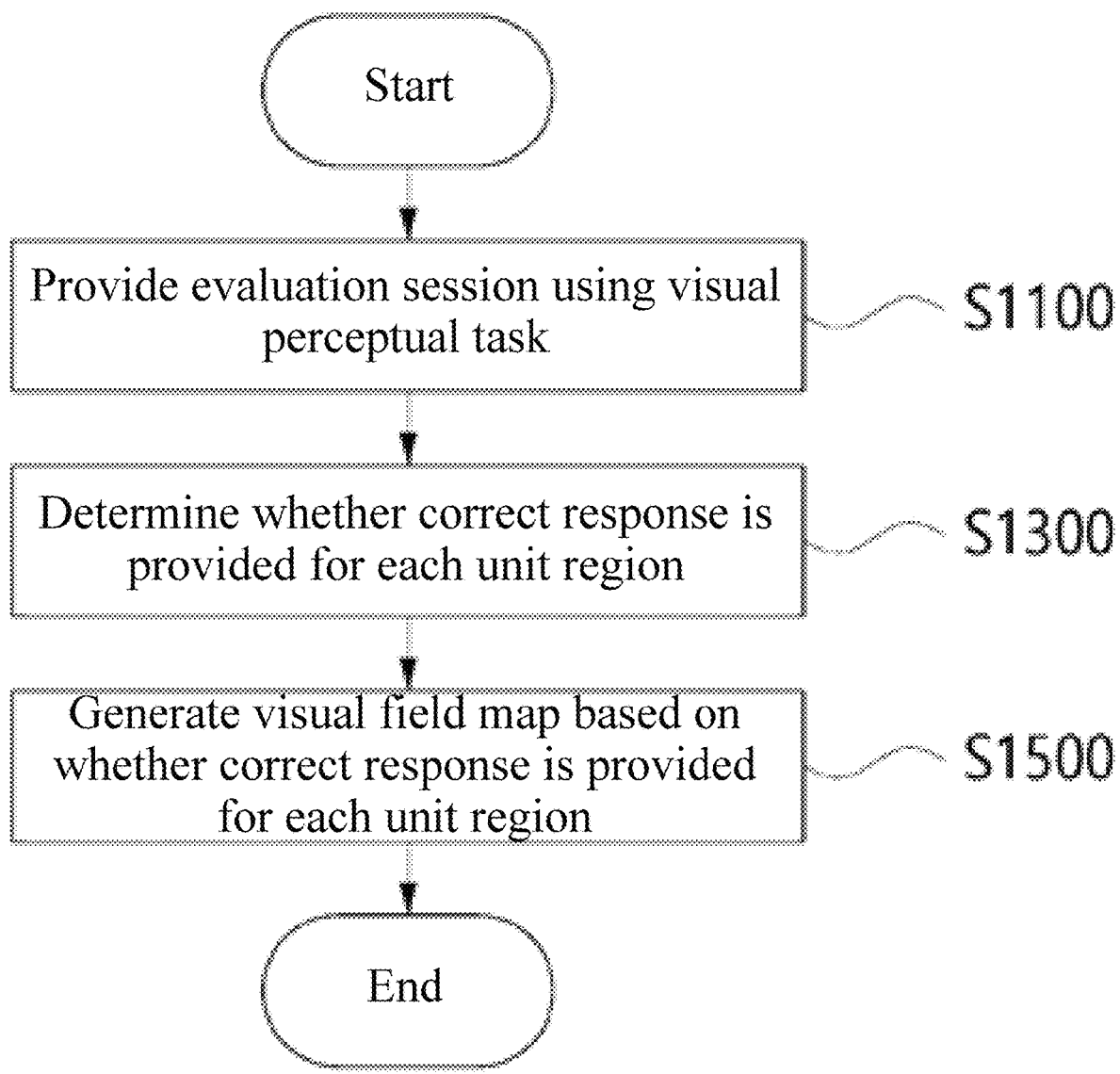
FIG. 7 is a flowchart of a method for obtaining a visual field map using a visual perceptual task according to an embodiment.

FIG. 7 is a flowchart of a method for obtaining a visual field map using a visual perceptual task according to an embodiment.

Referring to FIG. 7, the method for obtaining a visual field map using a visual perceptual task according to an embodiment may include providing an evaluation session using a visual perceptual task (S1100), determining whether a correct response is provided for each unit region (S1300), and generating a visual field map based on whether a correct response is provided for each unit region (S1500).

The device 100 for providing visual perceptual training may provide an evaluation session using a visual perceptual task (S1100). For example, the controller 1500 may provide an evaluation session using a visual perceptual task, which will be described later.

Specifically, the controller 1500 may provide a screen for a visual perceptual task in which a visual object for gaze fixation is displayed in a central region and other visual objects are displayed in peripheral regions of the visual object. Here, the visual object may be displayed at least once in all unit regions on the screen.

Also, the controller 1500 may provide a visual perceptual task and request a user's response related to the visual object from the user. Here, the user's response related to the visual object may be a response related to the attribute of the visual object.

The device 100 for providing visual perceptual training may determine whether a correct response is provided for each unit region (S1300).

For example, the controller 1500 may determine whether the user's response related to the visual object is correct or not in the evaluation session. Specifically, the controller 1500 may determine whether the user's response related to the visual object is correct for each unit region in which the visual object is displayed in the evaluation session.

Also, the controller 1500 may identify a rate (correct answer rate) at which the user's response related to the visual object is correct in the evaluation session. For example, when the visual object is displayed a plurality of times, the controller 1500 may determine how many times a correct response is obtained from the user.

The device 100 for providing visual perceptual training may generate a visual field map based on whether a correct response is provided for each unit region (S1500).

According to an embodiment, the controller 1500 may generate a visual field map based on whether a correct response is provided for each unit region in the evaluation session. For example, the controller 1500 may determine a region for which the user makes a correct response as a normal area and a region for which the user makes an incorrect response as a defect region, and generates a visual field map including a plurality of unit regions based on the results of the determination.

According to an embodiment, the controller 1500 may generate a visual field map based on a correct rate for each unit region in the evaluation session. For example, the controller 1500 may generate a visual field map such that a vision index indicating a higher vision ability as the correct answer rate for each unit region is higher is allocated to a corresponding unit region.

Here, the first vision index is allocated to the first unit region having a first correct rate with respect to the response related to the second visual object, and the second vision index is allocated to the second unit region having a second correct rate higher than the first correct rate with respect to the response related to the second visual object, and the second vision index may reflect a higher vision ability than the first vision index.

However, this is not necessary, and the device 100 for providing visual perceptual training may obtain the visual field map in another method without being limited to the above-described method, such as receiving the user's visual field map generated by another device through the communication module 1400.

Also, the device 100 for providing visual perceptual training may provide a visual perceptual task (S2000).

The controller 1500 may display a visual object on the output module 1100 for the user's visual perceptual learning, and provide a visual perceptual task for requesting a response related to identification of the displayed visual object. For example, the controller 1500 may display a first visual object and a second visual object through the output module 1100 and request a response from the user related to at least one of the first visual object and the second visual object.

Figure 8:
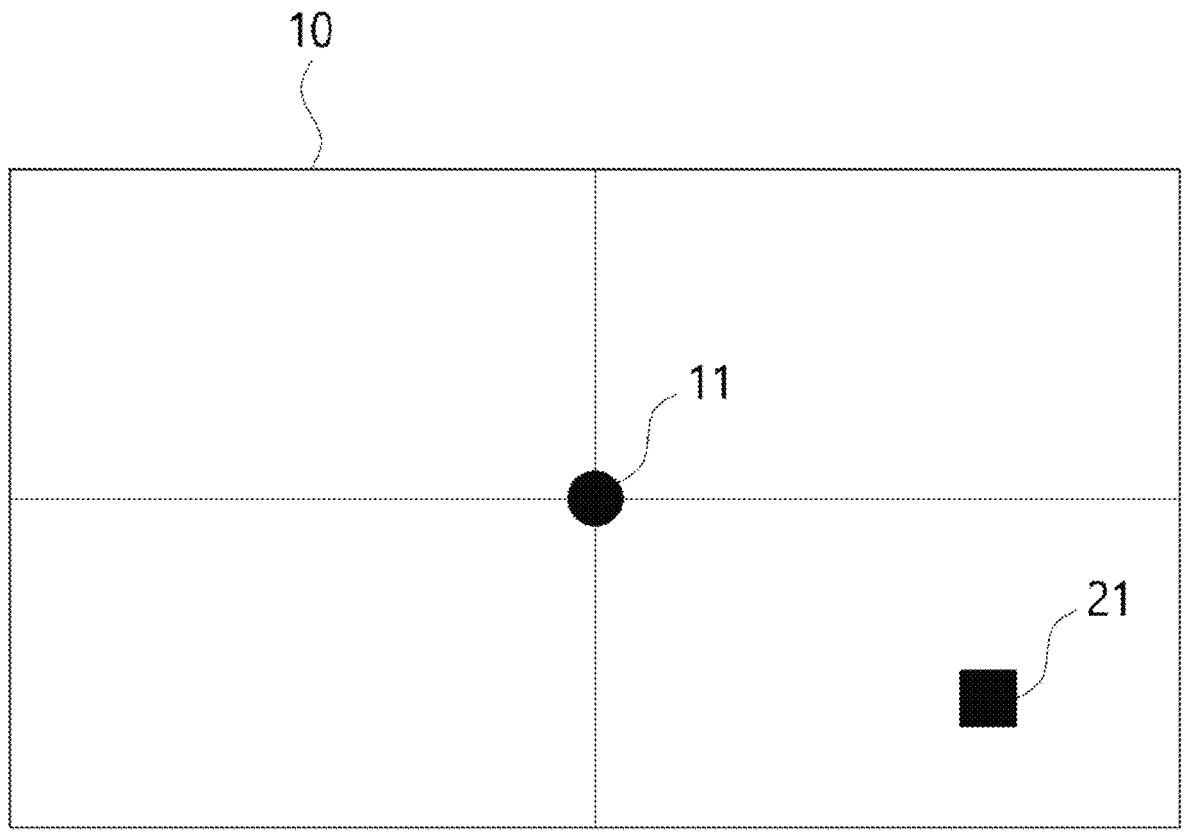
FIG. 8 is a diagram showing a screen for providing a visual perceptual task according to an embodiment.

FIG. 8 is a diagram showing a screen for providing a visual perceptual task according to an embodiment.

Referring to FIG. 8, the controller 1500 may display a screen 10 providing a visual perceptual task including a first visual object 11 and a second visual object 21 through the output module 1100.

According to an embodiment, the controller 1500 may display at least one of the first visual object 11 and the second visual object 21. For example, the controller 1500 may display the first visual object 11 in the center of the screen 10 and display the second visual object 21 in the periphery.

Also, the controller 1500 may request a response from the user related to at least one of the first visual object 11 and the second visual object 21. For example, the controller 1500 may obtain the user's response that the first visual object 11 is a circle and the second visual object 21 is a rectangle. As another example, the controller 1500 may obtain the user's response that the first visual object 11 and the second visual object 21 are not the same. As another example, the controller 1500 may obtain the user's response that the second visual object 21 exists.

Of course, a request for a response related to the visual object may include various types of requests for user input, and the absence of a user input may be one of the types of the user's response. For example, the controller 1500 may request the absence of a user input when the first visual object 11 displayed is a circle.

However, the screen 10 providing the visual perceptual task of FIG. 8 is only an example, and the screen 10 is not limited thereto, such as being displayed in a different form.

Figure 9:
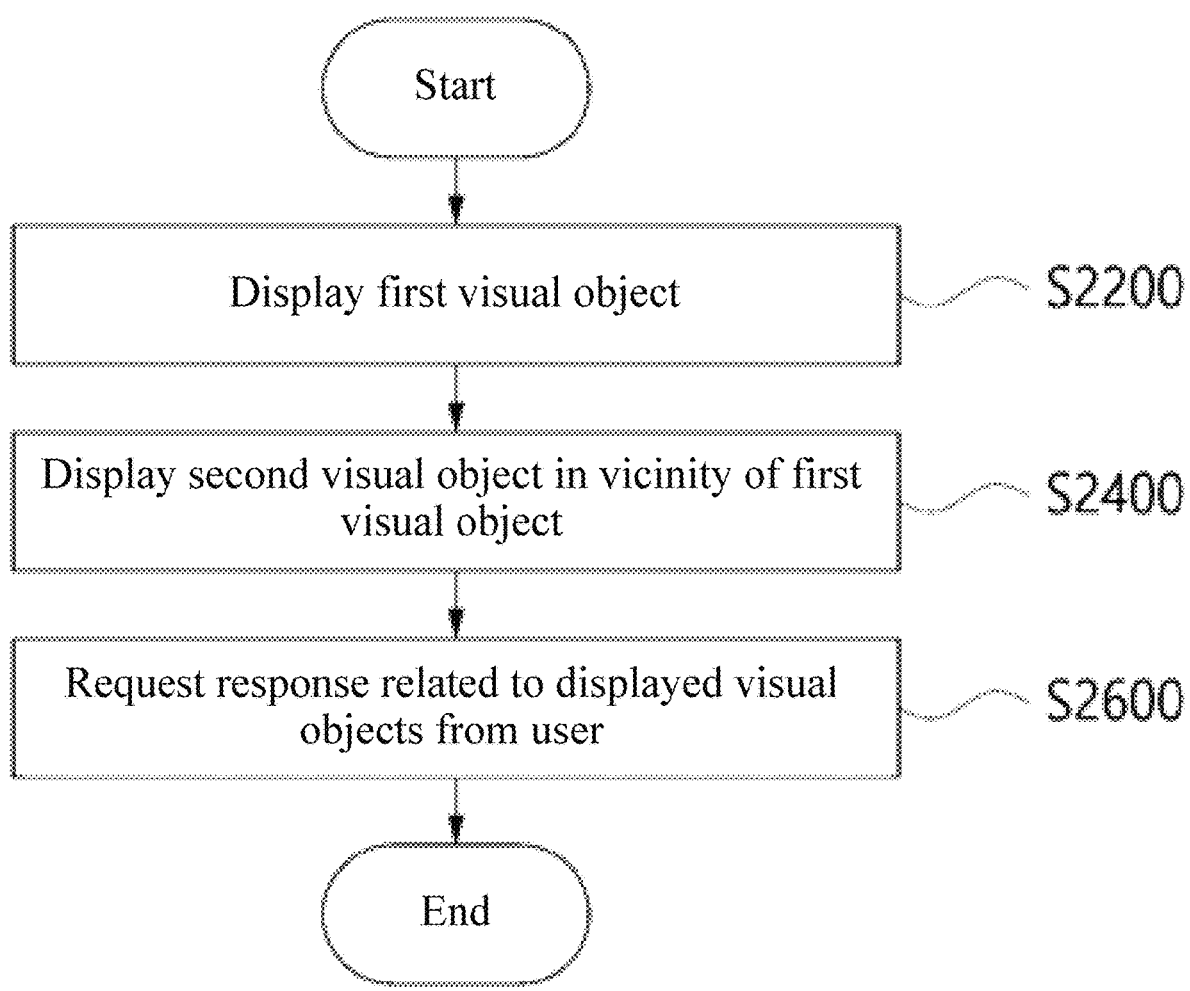
FIG. 9 is a flowchart of a method for providing a visual perceptual task according to an embodiment.

FIG. 9 is a flowchart of a method for providing a visual perceptual task according to an embodiment.

Referring to FIG. 9, a method of providing a visual perceptual task according to an embodiment may include displaying a first visual object (S2200), displaying a second visual object around the first visual object (S2400), and receiving a user's response related to the displayed visual objects (S2600).

The device 100 for providing visual perceptual training may display a first visual object (S2200).

The controller 1500 may display the first visual object for gaze fixation through the output module 1100. For example, the controller 1500 may display the first visual object at the center point of the screen through the output module 1100 for central fixation of the user. Of course, the controller 1500 may display the first visual object through the output module 1100 at any position on the central region of the screen rather than the central point of the screen.

The first visual object is a stimulus serving as a fixation point for a visual perceptual task, and the first visual object may be provided in various forms, such as a two-dimensional form or a three-dimensional form. For example, the first visual object may be provided as a character, a figure, a Gabor patch, or the like, but not limited thereto.

Also, the first visual object may be provided as a visual object having attributes such as an attribute of rotating in a specific direction, but is not limited thereto. For example, the attribute of the first visual object may be existence or absence, contrast, color, size, shape, display time, brightness, movement, rotation, pattern, depth, or the like.

In addition, the first visual object may be provided as a Gabor patch having a specific attribute, but is not limited thereto. For example, the attribute of the Gabor patch may be a pattern frequency, a pattern orientation, a pattern width, a pattern contrast, or the like.

Also, the device 100 for providing visual perceptual training may display the second visual object (S2400).

The controller 1500 may display the second visual object in the vicinity of the first visual object through the output module 1100. For example, the controller 1500 may display the second visual object at a position corresponding to the defect region of the user on the screen. Of course, the controller 1500 may display the second visual object at any position on the screen through the output module 1100, such as at a position corresponding to the normal region of the user rather than the position corresponding to the defect region of the user on the screen through the output module 1100.

The second visual object is a stimulus serving to assist visual perceptual learning by requesting a response from the user, and the second visual object may be provided in various forms, such as a two-dimensional form or a three-dimensional form. For example, the second visual object may include a character, a figure, a Gabor patch, or the like, but not limited thereto.

In addition, the second visual object may be provided as a visual object having attributes such as an attribute of rotating in a specific direction. For example, the attribute of the second visual object may be existence or absence, contrast, color, size, shape, display time, brightness, movement, rotation, pattern, depth, or the like, but not limited thereto.

In addition, the second visual object may be provided as a Gabor patch having a specific attribute, but is not limited thereto. For example, the attributes of the Gabor patch may be pattern frequency, pattern direction, pattern width, pattern contrast, or the like.

Also, the second visual object may be different from the first visual object, but may be the same as the first visual object.

Also, the controller 1500 may simultaneously display the second visual object and the first visual object through the output module 1100. For example, the controller 1500 may simultaneously display the second visual object and the first visual object through the output module 1100 so as to allow the user to check the second visual object while looking at the first visual object.

Also, the device 100 for providing visual perceptual training may request a response related to the displayed visual objects from the user (S2600).

The controller 1500 may obtain the user's response related to at least one of the first visual object and the second visual object from the input module 1200. For example, the controller 1500 may receive from the input module 1200 a user's response related to at least one attribute of the first visual object and the second visual object. Here, the attributes of the visual object may be, for example, existence or absence, contrast, shape, color, size, display time, brightness, movement, rotation, pattern, depth, and the like.

According to an embodiment, the controller 1500 may obtain a user's response related to the relationship between the first visual object and the second visual object from the input module 1200.

For example, the controller 1500 may receive, from the input module 1200, a user's response related to whether the first visual object and the second visual object themselves or their attributes are the same. Specifically, the controller 1500 may receive a user's response with respect to whether of the first visual object and the second visual object exist or not, or whether the contrasts, colors, shapes, sizes, display times, brightnesses, movements, rotations, patterns, depths, or the like of the first visual object and the second visual object are the same.

Also, the method for providing visual perceptual training according to an embodiment may further include determining whether a response obtained by the device 100 for providing visual perceptual training is correct.

The controller 1500 may determine whether the obtained response is correct based on the user's response related to the visual object. For example, when the controller 1500 obtains, from the input module 1200, a user response that the first and second visual objects are the same when the first and second visual objects different from each other are displayed through the output module 1100, the controller 1500 may determine that the obtained response is not correct.

Also, the method for providing visual perceptual training according to an embodiment may further include adjusting, by the device 100 for providing visual perceptual training, the difficulty of the visual perceptual task.

For example, the controller 1500 may determine the difficulty of the visual perceptual task based on the obtained user's response. Specifically, the controller 1500 may increase the difficulty of the visual perceptual task when the user's response related to the visual object is correct or consecutively correct. In addition, the controller 1500 may lower the difficulty of the visual perceptual task when the user's response is incorrect or is incorrect consecutively.

Also, the device 100 for providing visual perceptual training may change a screen for providing a visual perceptual task to increase or decrease the difficulty of the visual perceptual task. For example, the controller 1500 may increase or decrease the difficulty of the visual perceptual task by changing the displayed visual object. Specifically, the controller 1500 may change the attribute (e.g., existence or absence, contrast, size, shape, display time, brightness, movement, rotation, pattern, depth, or the like) of a displayed visual object to increase or decrease the difficulty of the visual perceptual task.

According to an embodiment, the controller 1500 may increase or decrease the difficulty of the visual perceptual task by changing the contrast of the displayed visual object. For example, the controller 1500 may increase the difficulty by lowering the contrast of at least one of the first visual object and the second visual object, which is displayed.

Also, according to an embodiment, the controller 1500 may increase or decrease the difficulty of the visual perceptual task by changing the size of the displayed visual object. For example, the controller 1500 may increase the difficulty by decreasing the size of at least one of the first visual object and the second visual object which is displayed.

Also, according to an embodiment, the controller 1500 may increase or decrease the difficulty of the visual perceptual task by changing a time during which the visual object is displayed. For example, the controller 1500 may increase the difficulty by decreasing the display time of at least one of the first visual object and the second visual object.

Of course, the device 100 for providing visual perceptual training may increase or decrease the difficulty of a visual perceptual task in various methods such as changing the brightness, saturation, and size of a screen that provides the visual perceptual task, or changing the number of displayed visual objects to increase or decrease the difficulty, without being limited to the above-described method. For example, the device 100 for providing visual perceptual training may increase the number of displayed visual objects to increase the difficulty of the visual perceptual task.

Hereinafter, various embodiments of the visual perceptual task provided by the device 100 for providing visual perceptual training will be described.

According to an embodiment, in order to improve the effect of visual perceptual learning, the controller 1500 may display, through the output module 1100, a visual object that is generally difficult for a user to clearly focus on.

For example, the controller 1500 may display a screen providing a visual perceptual task including a stimulus for accommodation through the output module 1100. Specifically, the controller 1500 may display a screen for a visual perceptual task including a Gabor patch, letters, and the like through the output module 1100.

According to an embodiment, the controller 1500 may display a first visual object in a letter type through the output module 1100.

For example, the controller 1500 may display the first visual object as a lowercase letter, a vowel, a consonant, or the like. Specifically, the controller 1500 may provide the first visual object 11 as at least one of English alphabets.

According to an embodiment, the controller 1500 may display the second visual object 21 as a Gabor patch. A Gabor patch is a patch using a series of differences of Gaussians (DOG) stimuli, which appear as blurred lines, as a pattern made of dark and light stripes in a desired direction and at a desired angle. In general, the Gabor patch is treated as patterns that are optimized to stimulate unused human photoreceptors. Accordingly, the device 100 for providing visual perceptual training may improve brain plasticity by the user's visual perceptual learning by displaying the Gabor patch.

For example, the controller 1500 may provide the second visual object 21 as a Gabor patch in which the direction, angle, brightness, or the like of the stripes are variously adjusted. Specifically, the controller 1500 may provide the second visual object as a Gabor patch having vertical or horizontal stripes, or the like.

According to an embodiment, the controller 1500 may request a response related to the visual objects from the user.

For example, the controller 1500 may obtain the user's responses respectively related to the first visual object and the second visual object from the input module 1200. Specifically, the controller 1500 may obtain, from the input module 1200, the user's response for identifying which first visual object 11 is displayed and the user's response for identifying which second visual object 21 is displayed, individually.

Of course, the controller 1500 may request a response from the user related to the visual objects in other methods, such as a method of obtaining one response related to the relationship between the first visual object and the second visual object (e.g., one response that the visual objects are different from each other) from the input module 1200.

Figure 10:
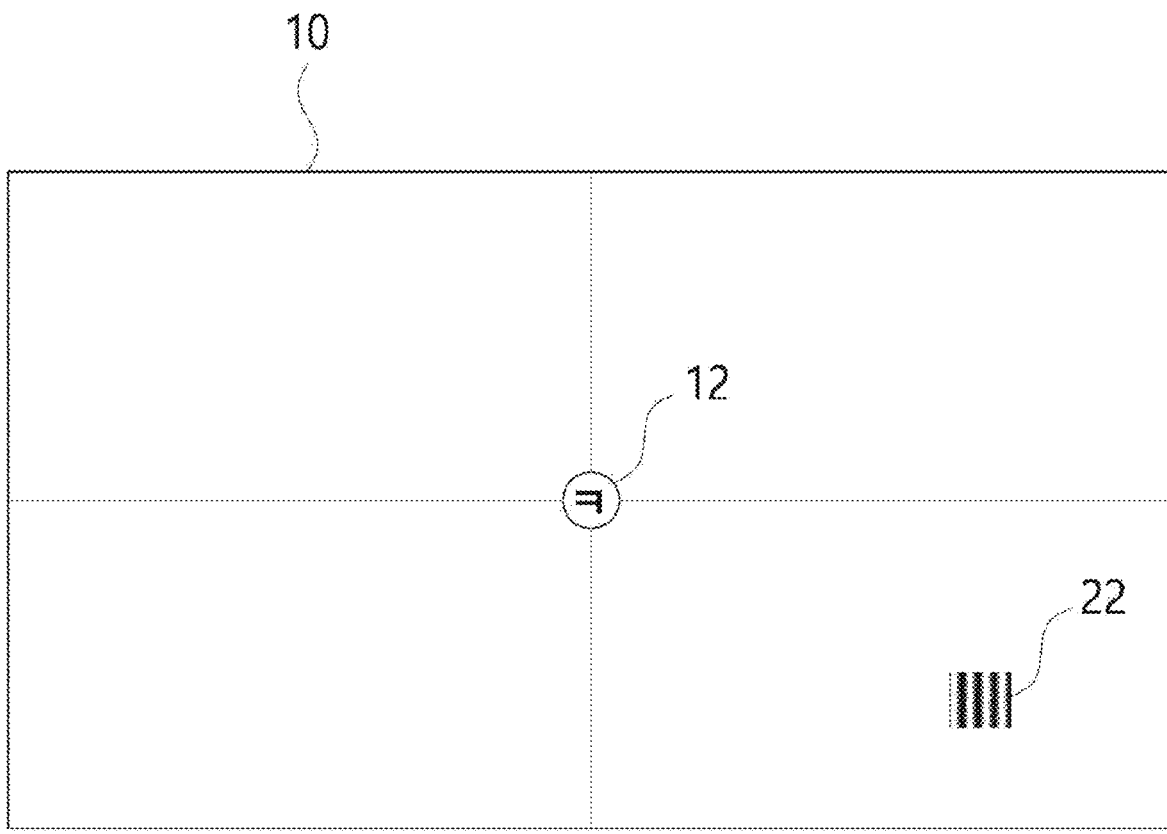
FIG. 10 is a diagram showing a screen for providing a visual perceptual task according to another embodiment.

FIG. 10 is a diagram showing a screen for providing a visual perceptual task according to another embodiment.

Referring to FIG. 10, the controller 1500 may display the screen 10 for a visual perceptual task including at least one of a character 12 and a Gabor patch 22 through the output module 1100.

For example, the controller 1500 may request and obtain a response related to which character of the Korean consonant " " or " " is displayed, as the first visual object 21. Also, the controller 1500 may request and obtain a response related to which Gabor patch is displayed among a Gabor patch having a vertical pattern direction or a Gabor patch having a horizontal pattern direction as the second visual object 22.

Of course, the device 100 for providing visual perceptual training may change and provide the visual objects, such as providing the first visual object as a Gabor patch and providing the second visual object as a letter type, without being limited to the above-described method.

According to an embodiment, the device 100 for providing visual perceptual training may provide a visual perceptual task for receiving one response related to the relationship between the displayed visual objects. In this case, the user's ability to perform a visual perceptual task increases compared to the case where the user identifies each visual object, so that the effect of visual perceptual learning through the apparatus 100 for providing visual perceptual training may be improved. To this end, the device 100 for providing visual perceptual training may display visual objects having specific attributes.

According to an embodiment, the controller 1500 may display the same type of visual objects through the output module 1100. Specifically, the controller 1500 may display a first visual object and a second visual object that are Gabor patches through the output module 1100. Here, the displayed visual objects may have specific attributes, and the attributes may be, for example, existence or absence, contrast, size, shape, color, display time, shape, brightness, movement, rotation, pattern, depth, and the like.

Of course, the device 100 for providing visual perceptual training may display visual objects through the output module 1100 in other methods, such as displaying first and second visual objects having the same attributes but having different types through the output module 1100.

According to an embodiment, the controller 1500 may request a response to the relationship between the displayed first and second visual objects from a user.

For example, the controller 1500 may obtain a user's response determining whether the first visual object and the second visual object are the same. Specifically, when the first visual object and the second visual object are Gabor patches, the controller 1500 may obtain a user's response determining whether both visual objects exist or not, or whether the contrasts, sizes, shapes, colors, display times, brightnesses, movements, rotations, patterns, depths, or the like of the both visual objects are the same.

As another example, the controller 1500 may obtain a user's response identifying whether the attributes of the first visual object and the second visual object are the same. Specifically, when the first visual object and the second visual object are Gabor patches, the controller 1500 may obtain the user's response for identifying whether the pattern frequencies, pattern directions, pattern widths, pattern contrasts, or the like of both visual objects are the same.

According to an embodiment, the controller 1500 may increase or decrease the difficulty of the visual perceptual task by changing the difference between the visual objects.

The controller 1500 may increase the difficulty of the visual perceptual task by reducing a difference between specific attributes of the first and second visual objects. For example, the controller 1500 may increase the difficulty of the visual perceptual task by reducing a difference in pattern directions of the first and second visual objects. As another example, the controller 1500 may increase the difficulty of the visual perceptual task by reducing the difference between the rotation directions of the first and second visual objects. Also, the controller 1500 may increase the difficulty of the visual perceptual task by reducing a difference in depth between the first and second visual objects.

Figure 11:
FIGS. 11 to 13 are diagrams showing screens for providing a visual perceptual task according to another embodiment.
Figure 12:
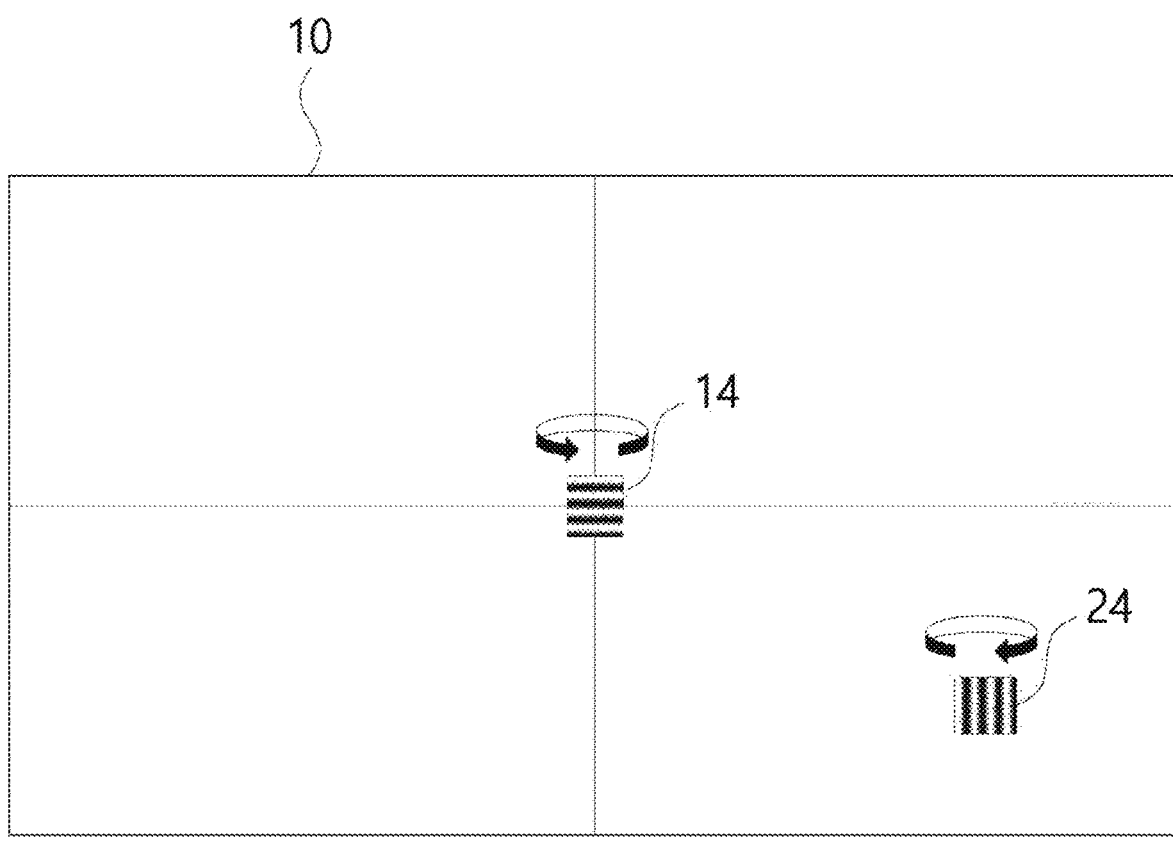
Figure 13:
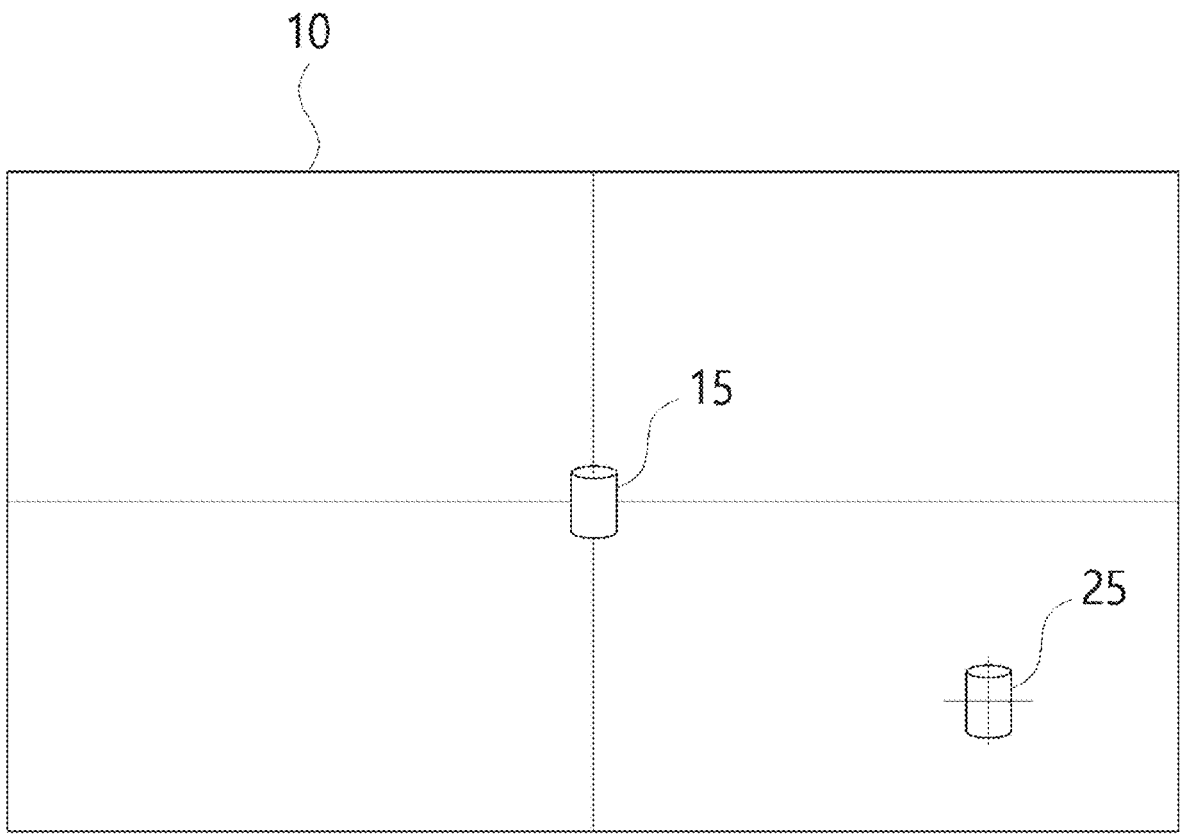

FIGS. 11 to 13 are diagrams showing screens for providing a visual perceptual task according to another embodiment.

Referring to FIG. 11, the device 100 for providing visual perceptual training may display a visual object having a specific pattern direction.

The device 100 for providing visual perceptual training may display the screen 10 including a first Gabor patch 13 and a second Gabor patch 23 respectively having specific pattern directions. In this case, the Gabor patches 13 and 23 may be provided as at least one of a Gabor patch having a pattern in a horizontal direction and a Gabor patch having a pattern in a vertical direction.

The device 100 for providing visual perceptual training may request a response related to the pattern direction of the first Gabor patch 13 and the second Gabor patch 23 from a user. For example, the device 100 for providing visual perceptual training may request, from the user, a response regarding whether the pattern direction of the first Gabor patch 13 and the pattern direction of the second Gabor patch 23 are the same. Specifically, the user may need to provide a response that the pattern directions of both Gabor patches 13 and 23 are different, because the pattern direction of the first Gabor patch 13 is the horizontal direction, and the pattern direction of the second Gabor patch 23 is the vertical direction.

Of course, the device 100 for providing visual perceptual training may provide visual objects in different ways, such as providing the first visual object and the second visual object in different colors or in different shapes, and request a related response for each visual object from the user, without being limited to the above-described method.

Referring to FIG. 12, the device 100 for providing visual perceptual training may display a visual object rotating in a specific direction.

The device 100 for providing visual perceptual training may display the screen 10 including a first Gabor patch 14 and a second Gabor patch 24 that rotate in specific directions. For example, the Gabor patches 14 and 24 may be provided as at least one of a Gabor patch rotating in a clockwise direction with respect to an axis and a Gabor patch rotating in a counterclockwise direction with respect to the axis.

The device 100 for providing visual perceptual training may request a response related to the rotational direction of the first Gabor patch 14 and the second Gabor patch 24 from a user. For example, the device 100 for providing visual perceptual training may request a response from the user regarding whether the first rotational direction of the first Gabor patch 14 and the second rotational direction of the second Gabor patch 24 are the same. Specifically, the user may need to provide a response that the rotational directions of both Gabor patches 14 and 24 are different, because the rotational direction of the first Gabor patch 14 is the counterclockwise direction with respect to the axis and the rotational direction of the second Gabor patch 24 in the clockwise direction with respect to the axis.

Of course, the device 100 for providing visual perceptual training may provide visual objects in different ways, such as providing the first visual object and the second visual object in different colors or in different shapes, and request a related response for each visual object from the user, without being limited to the above-described method.

Referring to FIG. 13, the device 100 for providing visual perceptual training may display a visual object having a specific depth.

Figure 15:
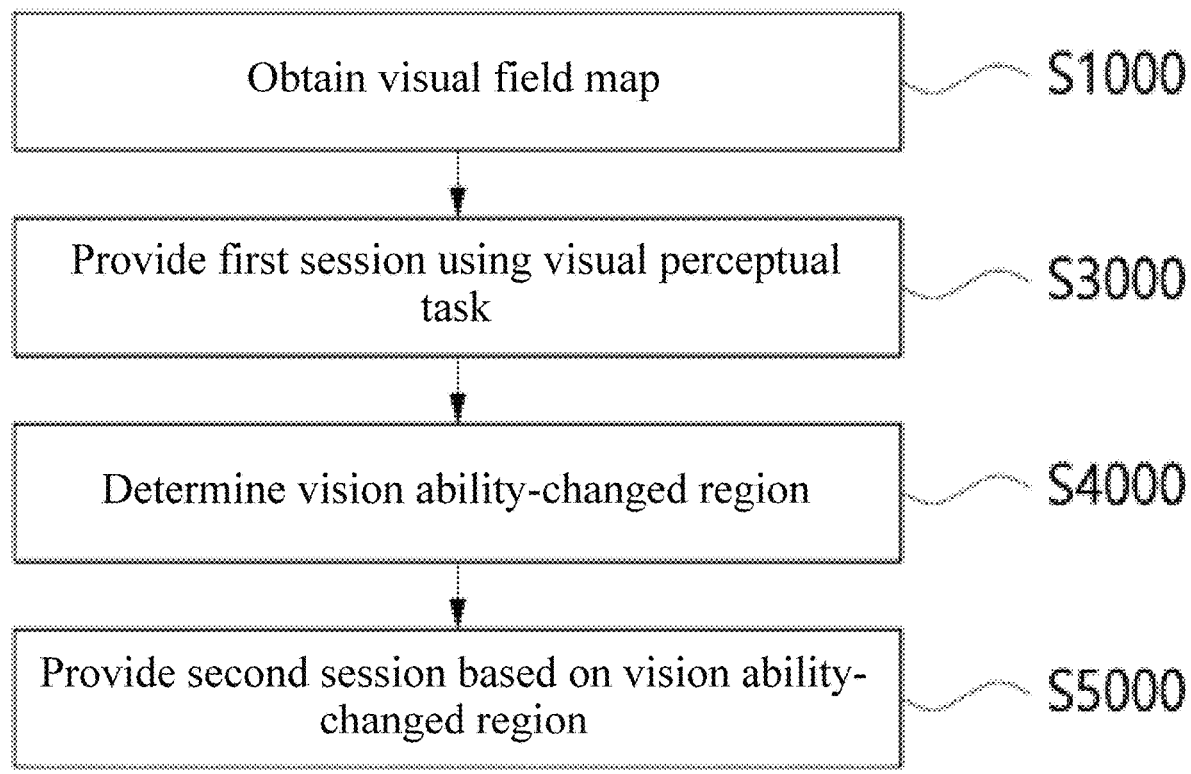
FIG. 15 is a flowchart of a method for providing visual perceptual training according to an embodiment.

The device 100 for providing visual perceptual training may display the screen 10 including a first FIG. 15 and a second FIG. 25 respectively having specific depths. Here, each of the FIGS. 15 and 25 may be provided as at least one of a figure displayed at a deep depth and a figure displayed at a shallow depth.

The device 100 for providing visual perceptual training may request a response related to the depths of the first FIG. 15 and the second FIG. 25 from a user. For example, the device 100 for providing visual perceptual training may request a response regarding whether the depth of the first FIG. 15 and the depth of the second FIG. 25 are the same from the user. Specifically, the user may need to provide a response that the depths of the Gabor patches 15 and 25 are different because the depth of the first Gabor patch 15 is shallow and the depth of the second Gabor patch 25 is deep.

It is noted that the device 100 for providing visual perceptual training may provide visual objects in different ways, such as providing the first visual object and the second visual object in different colors or in different shapes, and request a related response for each visual object from the user, without being limited to the above-described method.

Brain plasticity due to visual perceptual learning is increased when the user's defect region or its surroundings are stimulated through the visual perceptual task. In addition, a region of the field of vision in which the vision ability is improved over time by the method of providing visual perceptual training through the device 100 for providing visual perceptual training or other conventional training providing methods has superior improvement effect than other regions, and is expected to be more likely to the vision ability. Conversely, a region of the field of vision in which the vision ability deteriorates over time is a region in which the visual field defect continues to progress, and the vision ability is more likely to deteriorate. Therefore, it is important for the device 100 for providing visual perceptual training to determine which region to give the main stimulation.

Figure 14:
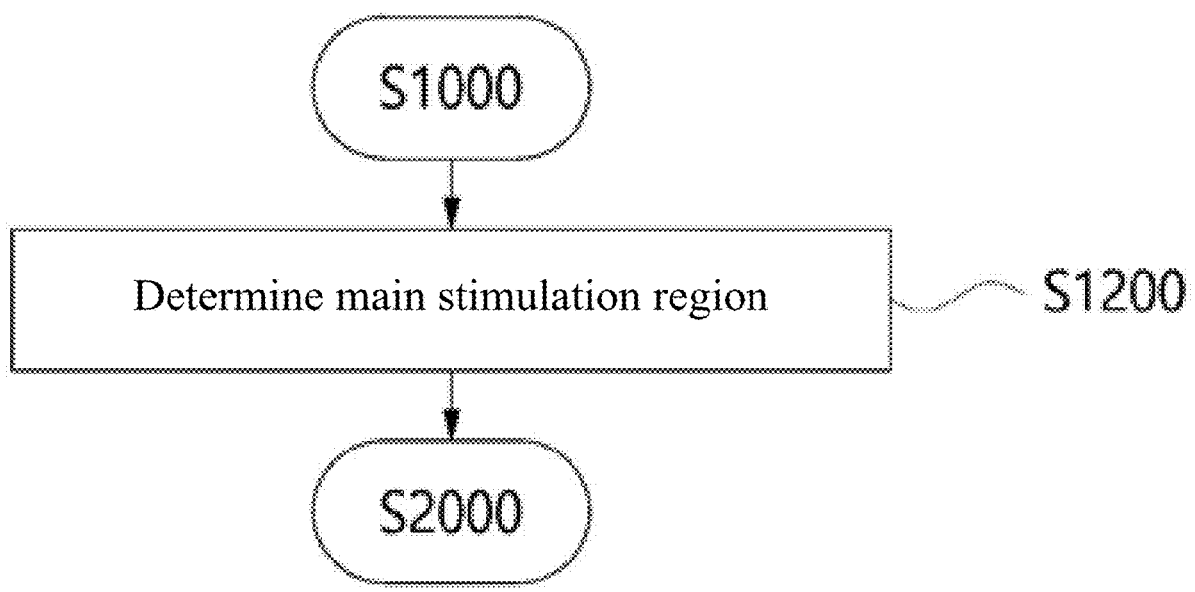
FIG. 14 is a flowchart for determining a main stimulation region according to an embodiment.

FIG. 14 is a flowchart for determining a main stimulation region according to an embodiment.

Referring to FIG. 14, according to an embodiment, the device 100 for providing visual perceptual training may determine a main stimulation region (S1200).

The main stimulation region is a high-priority region for training for visual field deficits, and may mean a region to which a stimulus is to be mainly given or a visual perceptual task is to be provided in a visual field map.

According to an embodiment, the controller 1500 may determine a defect region of the visual field map as the main stimulation region. For example, the controller 1500 may determine a region to which a vision index smaller than a preset vision index in the visual field map is assigned as the main stimulation region. Here, the periphery of the region determined as the defect region may also be determined as the main stimulation region. For example, a unit region adjacent to the defect region may also be determined as the main stimulation region.

According to an embodiment, the controller 1500 may determine the vision ability-changed region of the visual field map as a main stimulation region. For example, the controller 1500 may determine a region with a change in the vision index assigned between the first visual field map and the second visual field map acquired at different points of time as the main stimulation region.

Vision ability should be broadly interpreted as a concept that includes not only the ability of the eye, which is often measured according to the ability to identify letters, numbers, symbols, or the like in the order of size, but also the visual perceptual ability related to object recognition in the brain. For example, the eye normally receives visual stimuli, but the brain does not perceive the visual stimuli and does not see an object, which refers to a poor vision.

According to an embodiment, the vision ability-changed region may mean a region in which a vision ability is significantly changed. For example, the vision ability-changed region may be a region in which a change in vision index is equal to or greater than a preset value. Of course, the vision ability-changed region may be variously determined, such as a region in which a change in vision index is within a preset range.

Of course, the controller 1500 may determine the main stimulation region in various methods, such as determining, as the main stimulation region, a lower region of the visual field map, the region to which a vision index within a specific range is assigned.

In order to increase the visual perceptual improvement effect according to training for the determined main stimulation region as described above, the device 100 for providing visual perceptual training may intensively provide the visual perceptual task. For example, when the visual object is displayed a plurality of times, the device 100 for providing visual perceptual training may increase the frequency of displays of the visual object in the main stimulation region.

The method of providing visual perceptual training for a visual field defect according to an embodiment may further include determining a frequency for a location at which a visual object is displayed.

According to an embodiment, the controller 1500 may determine a frequency for a location at which the visual object is displayed on the screen based on the vision index assigned to the visual field map. For example, the controller 1500 may display a visual object more frequently in the second region to which a second vision index smaller than a first vision index is allocated than in a first region to which the first vision index is allocated.

Here, the visual object may be a second visual object. Of course, the controller 1500 may determine a frequency for a location at which a visual object is displayed on a screen in various methods, such as displaying the visual object through the output module 1100 more frequently at the location corresponding to the region to which the vision index within a specific range is assigned than at a location corresponding to the remaining regions.

The controller 1500 may determine a main stimulation region and determine a frequency for a location at which a visual object is displayed on a screen based on the determined main stimulation region. According to an embodiment, the controller 1500 may determine a frequency such that the visual object is displayed more frequently at the location of the screen corresponding to the main stimulation region.

For example, the controller 1500 may increase the frequency with which the second visual object is displayed at a location corresponding to the defect region. Specifically, the controller 1500 may display the second visual object more frequently at a location corresponding to the defect region than at a location corresponding to the normal region of the visual field map. In addition, the controller 1500 may display the second visual object more frequently at a location corresponding to the defect region of the visual field map than at a location corresponding to the remaining regions of a plurality of unit regions.

As another example, the controller 1500 may increase the frequency with which the second visual object is displayed at a location corresponding to the vision ability-changed region. Specifically, the controller 1500 may display the second visual object more frequently at a location corresponding to the vision ability-changed region of the visual field map than at a location corresponding to the remaining regions of a plurality of unit regions.

FIG. 15 is a flowchart of a method for providing visual perceptual training according to an embodiment.

Referring to FIG. 15, a method for providing visual perceptual training according to an embodiment may include obtaining a visual field map (S1000), providing a first session using a visual perceptual task (S3000), and determining a vision ability-changed region (S4000) and providing a second session based on the determined vision ability-changed region (S5000).

According to an embodiment, the device 100 for providing visual perceptual training may obtain a visual field map (S1000).

For example, the controller 1500 may obtain a visual field map based on an evaluation session using the visual perceptual task. Specifically, the controller 1500 may generate a visual field map in which a vision index reflecting a high vision ability is assigned to a unit region having a high correct answer rate of a response related to the second visual object in the evaluation session.

As another example, the controller 1500 may obtain a visual field map based on the result of a visual field test for the user.

The above-described contents may be applied as it is for the obtaining of the visual field map (S1000), and thus the more detailed description thereof will be omitted.

According to an embodiment, the device 100 for providing visual perceptual training may provide a first session using a visual perceptual task (S3000).

The controller 1500 may provide the first session using a visual perceptual task of displaying a first visual object and a second visual object. For example, the controller 1500 may provide the first session using a visual perceptual task of more frequently displaying a second visual object at a location corresponding to a defect region of the visual field map.

Here, the above-described contents may be applied as it is for the visual perceptual task used for the first session, and thus the more detailed description thereof will be omitted.

According to an embodiment, the device 100 for providing visual perceptual training may determine a vision ability-changed region (S4000).

Figure 16:
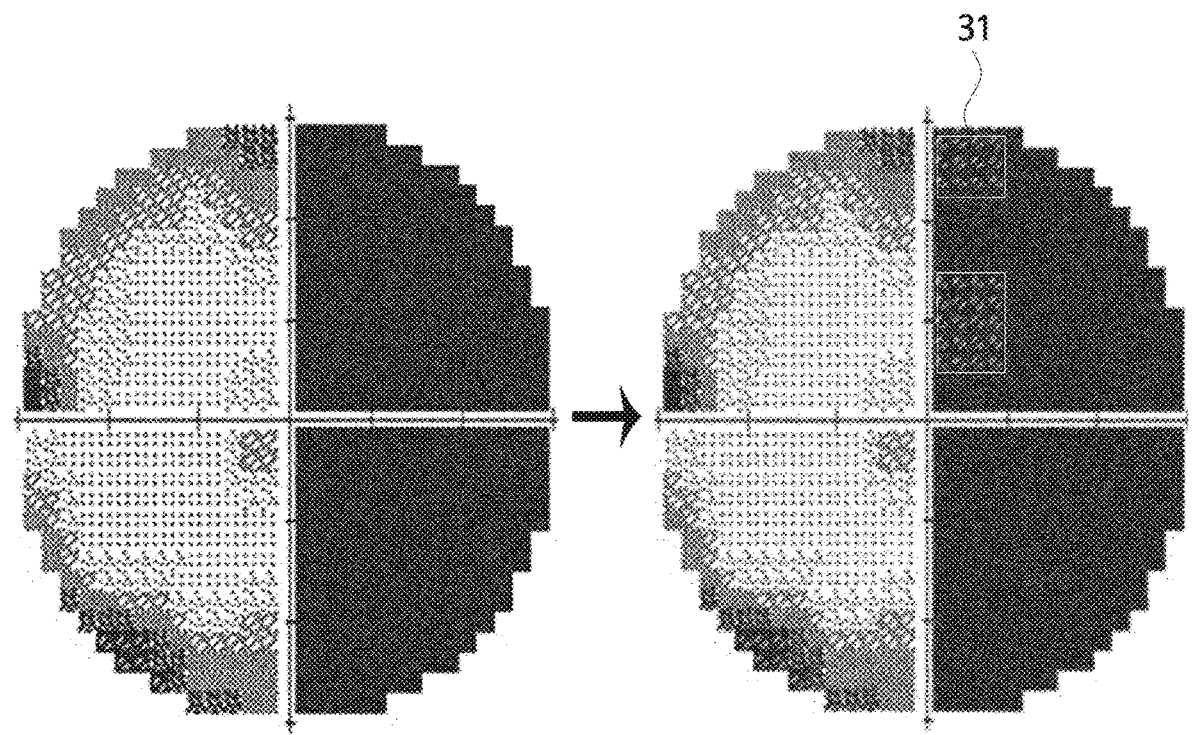
FIGS. 16 and 17 are diagrams showing changes in a visual field maps obtained at different points of time according to an embodiment.
Figure 17:
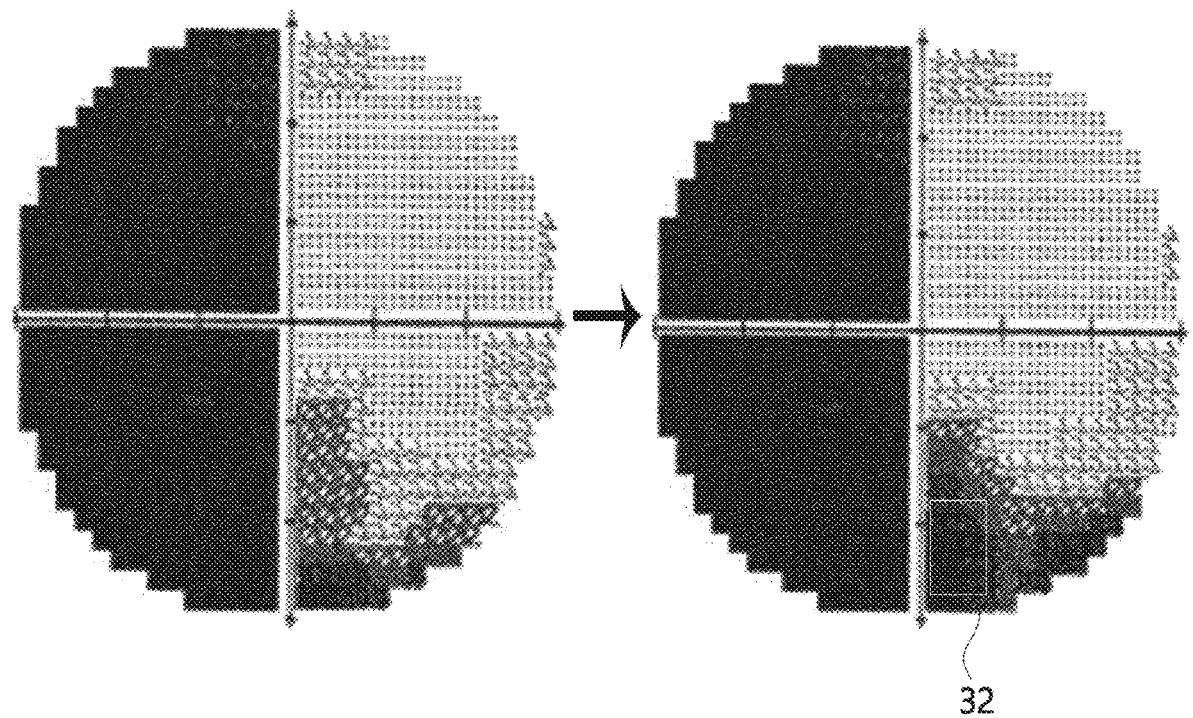

FIGS. 16 and 17 are diagrams showing changes in a visual field maps obtained at different points of time. Referring to FIGS. 16 and 17, the visual field map on the right represents a visual field map obtained after a predetermined time has elapsed from the time of obtained the visual field map on the left.

Referring to FIG. 16, a specific region 31 whose brightness has increased (improved vision ability) over time is shown. The controller 1500 may determine the region 31 as a vision ability-improved region. Of course, in the case of a visual field map to which a vision index in the form of a score is assigned, the vision ability-improved region may be determined in various ways, such as determining a specific region (with improved vision ability) whose assigned score increases over time as the vision ability-improved region.

Referring to FIG. 17, a specific region 32 whose brightness has become darker (vision ability is lowered) as time elapses is shown. The controller 1500 may determine the region 32 as a vision ability-decreased region. Of course, in the case of a visual field map to which a vision index in the form of a score is assigned, the vision ability-decreased region may be determined in various ways, such as determining a specific region (with decreased vision ability) whose assigned score decreases over time as the vision ability-decreased region.

According to an embodiment, the device 100 for providing visual perceptual training may determine a vision ability-changed region by comparing a first visual field map and a second visual field map obtained at different points of time. For example, the controller 1500 may compare vision indexes assigned to the same unit region in the first visual field map and the second visual field map obtained at different points of time, and determine a region with a change in vision index as a vision ability-changed region.

Figure 18:
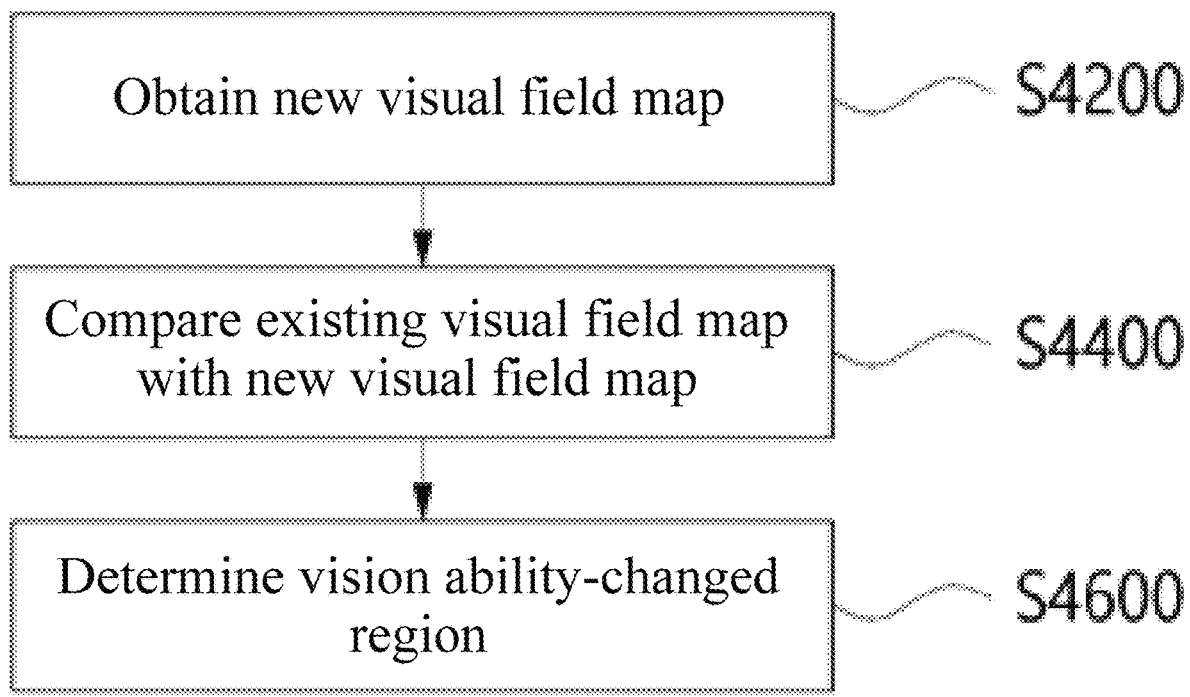
FIG. 18 is a flowchart of a method for determining a vision ability-changed region according to an embodiment.

FIG. 18 is a flowchart of a method for determining a vision ability-changed region according to an embodiment.

Referring to FIG. 18, a method for determining a vision ability-changed region according to an embodiment may include obtaining a new visual field map (S4200), comparing an existing visual field map with the new visual field map (S4400), and determining a vision ability-changed region (S4600).

The device 100 for providing visual perceptual training may obtain a new visual field map (S4200).

According to an embodiment, the controller 1500 may obtain a new visual field map based on a user's response in a first session using a visual perceptual task. For example, the controller 1500 may generate a visual field map based on whether a correct response is provided for each unit region on a screen in the provided visual perceptual task. Here, the details described in the method for generating the visual field map using the evaluation session may be applied as it is for the method for generating the visual field map, and thus a more detailed description thereof will be omitted.

Of course, the controller 1500 may obtain a new visual field map in another method, such as obtaining a new visual field map generated based on the result of a separate visual field test.

The device 100 for providing visual perceptual training may compare the existing visual field map and the new visual field map (S4400).

According to an embodiment, the controller 1500 may compare a newly-obtained visual field map with a previously-obtained visual field map. For example, the controller 1500 may compare vision indexes assigned to the same unit region of the both visual field maps.

The device 100 for providing visual perceptual training may determine a vision ability-changed region (S4600).

According to an embodiment, the controller 1500 may determine the vision ability-changed region based on the result of comparing the newly-obtained visual field map with a previously-obtained visual field map. For example, the controller 1500 may determine a region in which the vision index assigned to the same unit region of the both visual field maps is changed as a vision ability-changed region. Specifically, when the vision index is in the form of a score, the controller 1500 may determine a region in which the vision index increases as compared to that in the previously-obtained visual field map as a vision ability-improved region and a region in which the vision index decreases as a visual field-deteriorated region.

According to an embodiment, the controller 1500 may update the previously-obtained visual field map to determine a vision ability-changed region. For example, the controller 1500 may update the previously-obtained visual field map based on the user's response from the first session.

Figure 19:
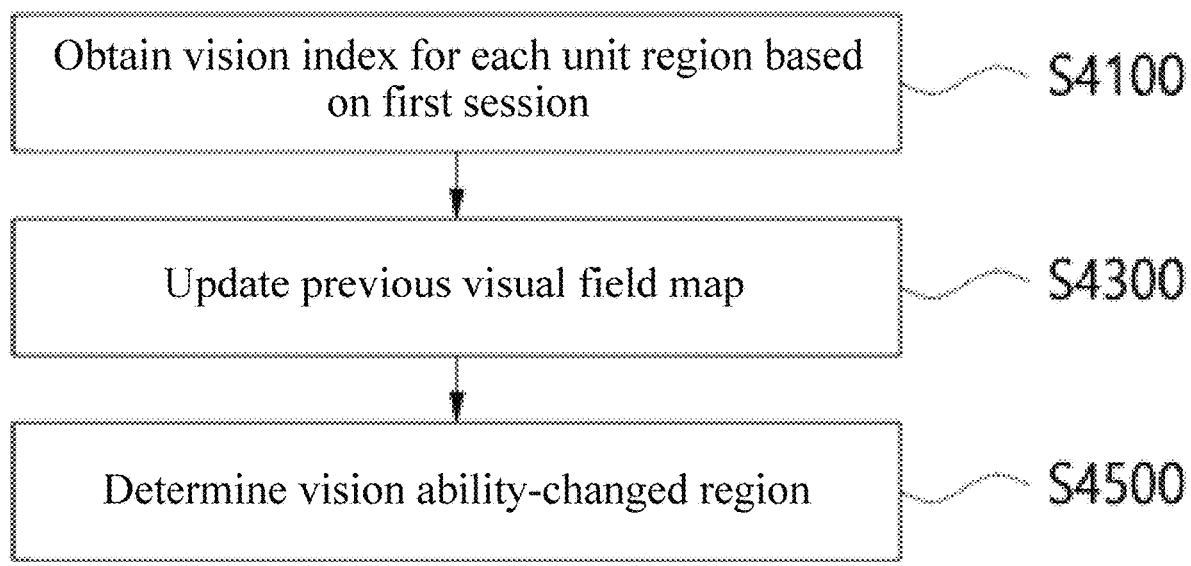
FIG. 19 is a flowchart of a method for determining a vision ability-changed region according to another embodiment.

FIG. 19 is a flowchart of a method of determining a vision ability-changed region according to another embodiment.

Referring to FIG. 19, a method for determining a vision ability-changed region according to an embodiment may include obtaining a vision index for each unit region based on a first session (S4100), updating an existing visual field map (S4300), and determining a vision ability-changed region (S4500).

The device 100 for providing visual perceptual training may obtain a vision index for each unit region based on the first session (S4100). According to an embodiment, the controller 1500 may obtain a vision index for each unit region based on a user's response in the first session using the visual perceptual task. For example, the controller 1500 may generate a vision index for each unit region to be updated in the visual field map based on whether a correct response is provided for each unit region in the visual perceptual task. Here, the details described in the method for generating the visual field map using the evaluation session may be applied as it is for the method of generating the vision index, and thus a more detailed description thereof will be omitted.

It is noted that, during or after the first session, the controller 1500 may obtain the vision index in another method, such as generating a vision index for each unit region to be updated on the visual field map based on the result of a separate visual field test.

The device 100 for providing visual perceptual training may update an existing visual field map (S4300).

According to an embodiment, the controller 1500 may update the existing visual field map based on the obtained vision index for each unit region. For example, the controller 1500 may replace a vision index assigned to each unit region of the existing visual field map with a newly-obtained vision index for each unit region. Here, the controller 1500 may compare the vision index assigned to the unit region of the existing visual field map with the newly-obtained vision index for each unit region, and replace only the vision index of a region in which a vision index is changed.

The device 100 for providing visual perceptual training may determine a vision ability-changed region (S4500).

According to an embodiment, the controller 1500 may determine a vision ability-changed region based on the updated visual field map. For example, when the vision index assigned to a unit region of the updated visual field map is different from the vision index assigned to the same unit region in the existing visual field map, the controller 1500 may determine the corresponding region as a vision ability-changed region. Specifically, when the vision index is in the form of a score, the controller 1500 may determine a region in which the vision index increases as compared to that in the updated visual field map as a vision ability-improved region and a region in which the vision index decreases as a visual field-deteriorated region.

Of course, the device 100 for providing visual perceptual training is not limited to the above-described configuration and may determine a vision ability-changed region in another method.

Also, according to an embodiment, the device 100 for providing visual perceptual training may provide a second session based on the determined vision ability-changed region (S5000).

According to an embodiment, the controller 1500 may provide a second session using a visual perceptual task for displaying a visual object more frequently through the output module 1100 at a location corresponding to the determined vision ability-changed region on the screen.

Figure 20:
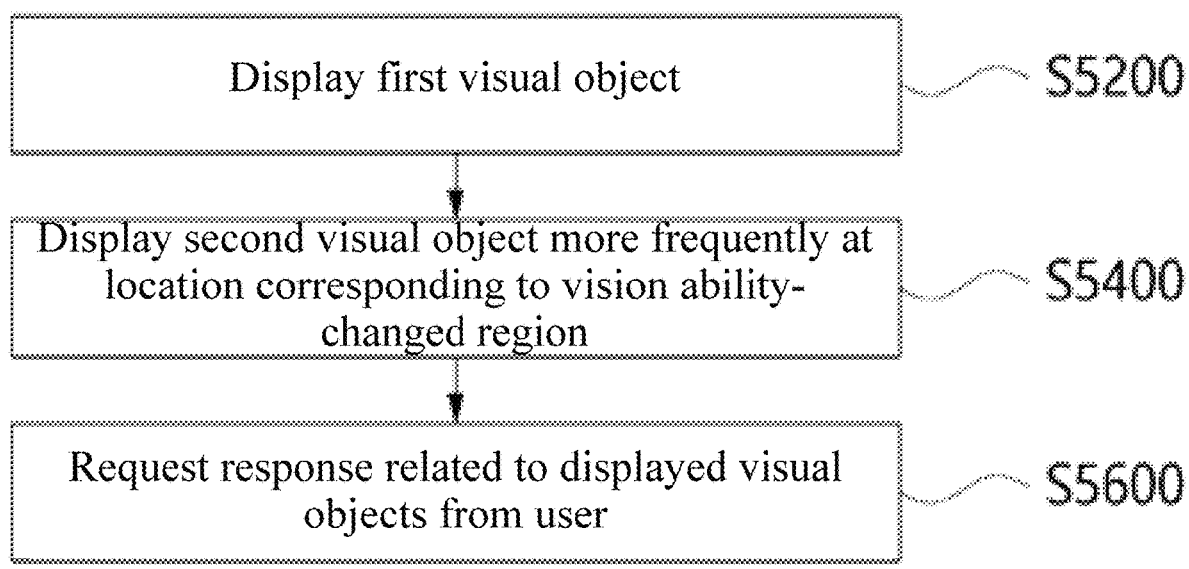
FIG. 20 is a flowchart of a method for providing a second session based on a vision ability-changed region according to an embodiment.

FIG. 20 is a flowchart of a method for providing a second session based on a vision ability-changed region according to an embodiment.

Referring to FIG. 20, a method for providing a second session based on the vision ability-changed region according to an embodiment may include displaying a first visual object (S5200), displaying a second visual object more frequently at a location corresponding to a vision ability-changed region (S5400) and requesting a response related to the displayed visual objects from a user (S5600).

The device 100 for providing visual perceptual training may display the first visual object (S5200). The controller 1500 may display the first visual object for gaze fixation through the output module 1100. For example, the controller 1500 may display the first visual object at the center point of the screen through the output module 1100 for a user's central fixation.

Since the above-described contents may be applied as it is for step S5200, a more detailed description thereof will be omitted.

The device 100 for providing visual perceptual training may more frequently display the second visual object at a location corresponding to the vision ability-changed region (S5400).

According to an embodiment, the controller 1500 may display the second visual object through the output module 1100 more frequently at a location corresponding to the vision ability-changed region than at locations corresponding to the remaining regions of a plurality of unit regions. For example, the controller 1500 may increase the frequency of display of each unit region of the screen corresponding to the vision ability-changed region compared to the frequencies of display for each unit region of the screen corresponding to the remaining regions of the plurality of unit regions. Of course, the controller 1500 may display the second visual object in various methods, such as increasing the number of times the second visual object is displayed at the location corresponding to the vision ability-changed region rather than the locations corresponding to the remaining regions of the plurality of unit regions.

According to an embodiment, the controller 1500 may display the second visual object through the output module 1100 at a location corresponding to a vision ability-deteriorated region more frequently than at a location corresponding to a vision ability-improved region. For example, the controller 1500 may increase the frequency of display for each unit region of the screen corresponding to the vision ability-deteriorated region than the frequency of display for each unit region of the screen corresponding to the vision ability-improved region. Of course, the controller 1500 may display the second visual object in various methods, such as increasing the number of times the second visual object is displayed at the location corresponding to the vision ability-deteriorated region compared to the position corresponding to the vision ability-improved region.

According to an embodiment, the controller 1500 may display the second visual object through the output module 1100 more frequently in the second session than in the first session at the location corresponding to the vision ability-changed region. For example, the controller 1500 may increase the frequency of display for each unit region of the screen corresponding to the vision ability-changed region in the second session than that in the first session. Of course, the controller 1500 may display the second visual object in various methods, such as increasing the number of times the second visual object is displayed at a location corresponding to the vision ability-changed region in the second session than that in the first session.

According to an embodiment, the controller 1500 may determine the frequency of display of the second visual object based on the degree of a change in vision ability of the vision ability-changed region. For example, the controller 1500 may display the second visual object more number of times at a second location (different from a first location) corresponding to the second unit region in which a change in vision ability is larger than that of the first unit region, as compared to the first location corresponding to the first unit region among the user's vision ability-changed regions.

Specifically, the controller 1500 may display the second visual object such that the frequency of display of the second visual object at a position corresponding to the first vision ability-changed region is greater than the frequency of display of the second visual object at a position corresponding to the second vision ability-changed region whose a change in vision index is smaller than that of in the first vision ability-changed region. It is noted that the controller 1500 may display the second visual object in various methods, such as a method of displaying the second visual object such that the number of times the second visual object is displayed at a position corresponding to the first vision ability-changed region is greater than the number of times the second visual object is displayed at a position corresponding to the second vision ability-changed region whose a change in vision index is smaller than that of in the first vision ability-changed region.

In addition, the controller 1500 may display the second visual object through the output module 1100 in another method, such as a method of displaying the second visual object at a position corresponding to the vision ability-improved region more frequently than a position corresponding to the vision ability-deteriorated region.

According to an embodiment, the controller 1500 may determine the frequency of display of the second visual object in consideration of the time period in which the vision ability is changed. For example, the controller 1500 may display the second visual object at a position corresponding to the first vision ability-changed region more frequently than at a position corresponding to the second vision ability-changed region when a change in the vision index of the first vision ability-changed region, in which a vision ability is changed for a first time period, is identical to a change in the vision index of the second vision ability-changed region in which a vision ability is changed for a second time period longer than a first time period. It is noted that the controller 1500 may display the second visual object through the output module 1100 in another method, such as a method of displaying the second visual object with a frequency opposite to the above-described method.

The device 100 for providing visual perceptual training may request a response related to the displayed visual objects from a user (S5600).

The controller 1500 may obtain the user's response related to at least one of the first visual object and the second visual object from the input module 1200. For example, the controller 1500 may receive from the input module 1200 a user's response related to at least one attribute of the first visual object and the second visual object.

The above-described contents may be applied as it is for step S5600, and thus, a more detailed description thereof will be omitted.

Figure 21:
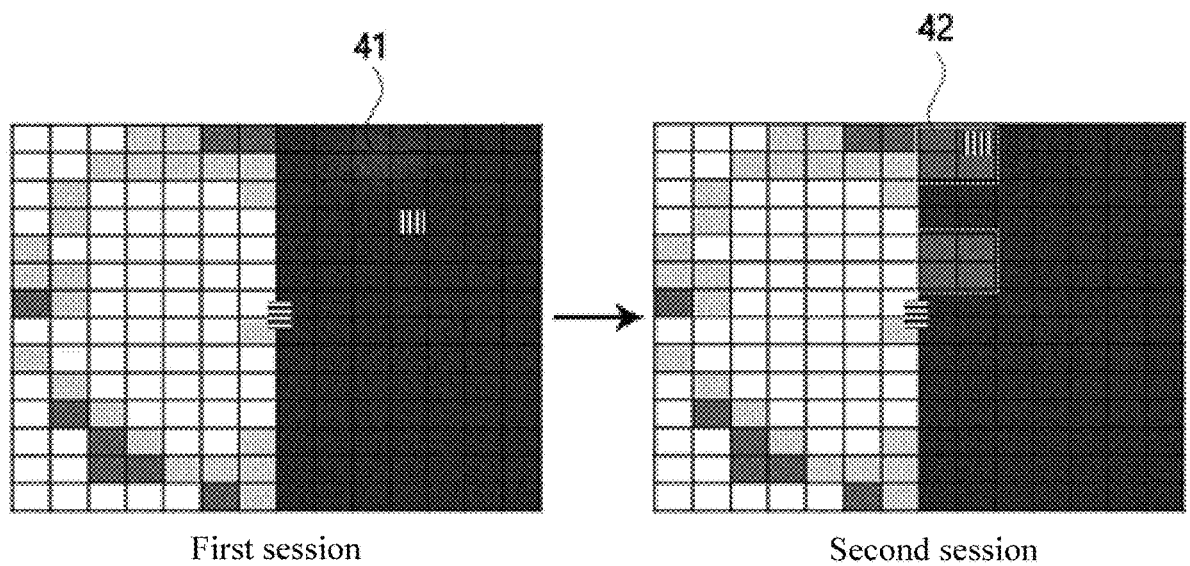
FIGS. 21 and 22 are examples of screens provided in the first session and the second session according to an embodiment.
Figure 22:
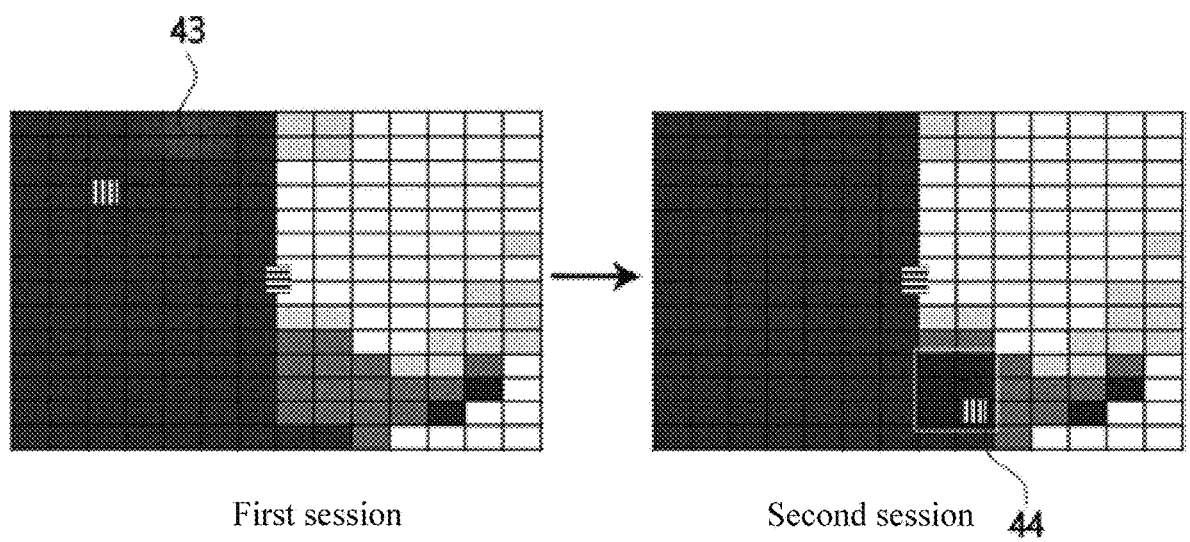

FIGS. 21 and 22 are examples of screens provided in the first session and the second session according to an embodiment.

Referring to FIGS. 21 and 22, it can be seen that a visual perceptual task is provided on a screen corresponding to the visual field map in FIG. 4.

Referring to FIG. 21, although the device 100 for providing visual perceptual training may display a visual object at an arbitrary location in the first session, it can be seen that the device 100 for providing visual perceptual training displays the visual object more frequently at the location 41 corresponding to the defect region of the visual field map. In addition, although the device 100 for providing visual perceptual training may display the visual object at an arbitrary position in the second session, the device 100 for providing visual perceptual training may display the visual object more frequently at the location 42 corresponding to the vision ability-improved region determined based on the existing visual field map and the newly-obtained visual field map.

Referring to FIG. 22, in the first session, the device 100 for providing visual perceptual training may display a visual object at an arbitrary location, but it can be also seen that the device 100 for providing visual perceptual training displays the visual object more frequently at the location 43 corresponding to the defect region of the visual field map. In addition, although the device 100 for providing visual perceptual training may display the visual object at an arbitrary position in the second session, the device 100 for providing visual perceptual training may display the visual object more frequently at the location 44 corresponding to the vision ability-deteriorated region determined based on the existing visual field map and the newly-obtained visual field map.

According to the inventive concept, it is possible to induce a user's concentration by using the visual perceptual learning to identify visual objects, and to increase the visual perceptual learning effect.

In addition, according to the inventive concept, it is possible to minimize the decrease in vision ability or to increase the visual field improvement by adjusting the frequency of training of the region in which the vision ability is improved or deteriorated through visual perceptual learning.

The above-described methods may be embodied in the form of program instructions that can be executed by various computer means and recorded on a computer-readable medium. The computer readable medium may include program instructions, data files, data structures, and the like, alone or in combination. Program instructions recorded on the media may be those specially designed and constructed for the purposes of the inventive concept, or they may be of the kind well-known and available to those having skill in the computer software arts. Examples of computer readable recording media include magnetic media such as hard disks, floppy disks and magnetic tape, optical media such as CD-ROMs, DVDs, and magnetic disks such as floppy disks, Magneto-optical media, and hardware devices specifically configured to store and execute program instructions, such as ROM, RAM, flash memory, and the like. Examples of program instructions include not only machine code generated by a compiler, but also high-level language code that can be executed by a computer using an interpreter or the like. The hardware device described above may be configured to operate as one or more software modules to perform the operations of the present disclosure, and vice versa.

Although the embodiments have been described by the limited embodiments and the drawings as described above, various modifications and variations are possible to those skilled in the art from the above description. For example, the described techniques may be performed in a different order than the described method, and/or components of the described systems, structures, devices, circuits, etc. may be combined or combined in a different form than the described method, or other components, or even when replaced or substituted by equivalents, an appropriate result can be achieved.

Therefore, other implementations, other embodiments, and equivalents to the claims are within the scope of the following claims.

While the inventive concept has been described with reference to embodiments, it will be apparent to those skilled in the art that various changes and modifications may be made without departing from the spirit and scope of the inventive concept. Therefore, it should be understood that the above embodiments are not limiting, but illustrative.

What is claimed is:

1. A method for providing visual perceptual training using visual perceptual learning, the method being performed by a head mounted display device for providing visual perceptual training, the method comprising:

displaying, by a first display and a second display of the device, a first Gabor patch for central fixation of a user's visual field and at least one second Gabor patch around the first Gabor patch, wherein the first display is positioned to correspond to a left eye of the user, the second display is positioned to correspond to a right eye of the user, the first display outputs a first image, the second display outputs a second image, and a processor of the device adjusts the first image and the second image, to adjust at least one of parallax and focus of the first Gabor patch;

providing, by the processor and the first and second displays of the device, a first session using a visual perceptual task for requesting a response related to the second Gabor patch from the user;

receiving, by a handheld input module of the device, the response related to the second Gabor patch from the user's hand, wherein the response contains information that identifies at least one of a pattern frequency, a pattern direction, a pattern width, and a pattern contrast of the second Gabor patch;

obtaining, by the processor of the device, based on a result of the first session, a first visual field map having a plurality of unit regions, wherein each unit region of the plurality of unit regions of the first visual field map has a vision index reflecting the user's vision ability, assigned based on a correct rate with respect to the response related to the second Gabor patch;

displaying, by the first display and the second display of the device, the first visual field map, in which the vision index displayed darker as the user's vision ability is worse is assigned to the plurality of unit regions of the first visual field map;

displaying, by the display of the device, the first Gabor patch for central fixation of the user's visual field and the at least one second Gabor patch around the first Gabor patch, wherein the first Gabor patch and the second Gabor patch are overlayed on the displayed first visual field map;

providing, by the processor and the first and second displays of the device, another first session using the visual perceptual task for requesting a second response related to the second Gabor patch from the user;

receiving, by the handheld input module of the device, the response related to the second Gabor patch from the user's hand;

obtaining, by the processor of the device, based on a result of the another first session, a second visual field map having a plurality of unit regions, wherein each unit region of the plurality of unit regions of the second visual field map has the vision index reflecting the user's vision ability, assigned based on a correct rate with respect to a response related to the second Gabor patch;

comparing, by the processor of the device, the first visual field map with the second visual field map by comparing a respective vision index of a respective unit region of the first and second visual field maps;

determining, by the processor of the device, a vision ability-changed region, in which the vision index assigned to the same unit region of the both visual field maps is changed more than a predetermined value, among the plurality of unit regions; and providing, by the processor and the display of the device, a second session using the visual perceptual task, wherein the providing the second session comprises:

displaying the second Gabor patch at a location corresponding to the vision ability-changed region more frequently than at locations corresponding to remaining regions of the plurality of unit regions, and wherein: the vision ability-changed region comprises a first vision ability-changed region and a second vision ability-changed region, which have the same vision index; the user's vision ability in the first vision ability-changed region is changed during a first time period; the user's vision ability in the second vision ability-changed region is changed during a second time period, which is longer than the first time period; and the providing the second session further comprises:

displaying the second Gabor patch at a position corresponding to the first vision ability-changed region more frequently than at a position corresponding to the second vision ability-changed region.

2. The method of claim 1, wherein the response of the user is related to an attribute of the second Gabor patch, and
wherein the attributes of the second Gabor patch include at least one of existence or absence, contrast, size, shape, color, display time, brightness, movement, rotation, pattern, and depth.

3. The method of claim 1, wherein the response of the user is as to whether attributes of the first Gabor patch and the second Gabor patch are the same.

4. The method of claim 1, wherein the second Gabor patch is displayed more number of times at a second location corresponding to a second unit region in which a change in vision ability is larger than that of a first unit region, as compared to a first location corresponding to the first unit region among the user's vision ability-changed regions, and
wherein the first location is different from the second location.

5. The method of claim 1, wherein the vision ability-changed region includes at least one of a vision ability-improved region reflecting improvement of the user's vision ability and a vision ability-deteriorated region reflecting deterioration of the user's vision ability.

6. The method of claim 5, wherein the second Gabor patch in the second session is displayed more number of times at a location corresponding to the vision ability-deteriorated region, compared to at a location corresponding to the vision ability-improved region.

7. The method of claim 1, wherein the visual perceptual task requests an additional response related to the first Gabor patch from the user,
wherein the additional response relates to an attribute of the first Gabor patch, and
wherein the attributes of the first Gabor patch include at least one of existence or absence, contrast, size, shape, color, display time, brightness, movement, rotation, pattern, and depth.

8. The method of claim 1, wherein the obtaining of the visual field map includes
providing an evaluation session using the visual perceptual task; and
generating the visual field map based on the evaluation session,
wherein the visual field map is generated based on whether a response related to the second Gabor patch is correct in the evaluation session.

9. The method of claim 8, wherein a first vision index is assigned to a first unit region having a first correct rate with respect to a response related to the second Gabor patch,
wherein a second vision index is assigned to a second unit region having a second correct rate greater than the first correct rate with respect to a response related to the second Gabor patch, and
wherein the second vision index reflects a higher vision ability than the first vision index.

10. The method of claim 1, further comprising:
increasing, by the processor and the display of the device, difficulty of the visual perceptual task when the user's response related to the Gabor patch is correct or consecutively correct, by reducing difference in pattern directions of the Gabor patches, by reducing difference in rotation directions of the Gabor patches, or by reducing difference in depths of the Gabor patches, on the first display and the second display of the device.

11. A head mounted display device for providing visual perceptual training using visual perceptual learning, comprising:
- a first display and a second display;
- a handheld input module configured to obtain a signal corresponding to an input of a user; and
- a controller, comprising a processor, and configured to control an operation related to the visual perceptual training using the visual perceptual learning,
- wherein the controller is configured to:
- control the first display and the second display to display a first Gabor patch for central fixation of the user's visual field and at least one second Gabor patch around the first Gabor patch, wherein the first display is positioned to correspond to a left eye of the user, the second display is positioned to correspond to a right eye of the user, the first display outputs a first image, the second display outputs a second image, and the processor adjusts the first image and the second image, to adjust at least one of parallax and focus of the first Gabor patch;
- provide, by the first and second displays of the device, a first session using a visual perceptual task for requesting a response related to the second Gabor patch from the user;
- receiving, by the handheld input module of the device, the response related to the second Gabor patch from the user's hand, wherein the response contains information that identifies at least one of a pattern frequency, a pattern direction, a pattern width, and a pattern contrast of the second Gabor patch;
- obtain, based on a result of the first session, a first visual field map having a plurality of unit regions, wherein each unit region of the plurality of unit regions of the first visual field map has a vision index reflecting the user's vision ability, assigned based on a correct rate with respect to the response related to the second Gabor patch;
- control the first display and the second display to display the first visual field map, in which the vision index displayed darker as the user's vision ability is worse is assigned to the plurality of unit regions of the first visual field map;
- control the first display and the second display to display the first Gabor patch for central fixation of the user's visual field and the at least one second Gabor patch around the first Gabor patch, wherein the first Gabor patch and the second Gabor patch are overlayed on the displayed first visual field map;
- provide, by the first and second displays of the device, another first session using the visual perceptual task for requesting a second response related to the second Gabor patch from the user;
- receive, by the handheld input module of the device, the response related to the second Gabor patch from the user's hand;
- obtain, by the processor of the device, based on a result of the another first session, a second visual field map having a plurality of unit regions, wherein each unit region of the plurality of unit regions of the second visual field map has a vision index reflecting the user's vision ability, assigned based on a correct rate with respect to a response related to the second Gabor patch;
- compare the first visual field map with the second visual field map by comparing a respective vision index of a respective unit region of the first and second visual field maps;
- determine a vision ability-changed region, in which the vision index assigned to the same unit region of the both visual field maps is changed more than a predetermined value, among a plurality of unit regions; and
- provide a second session using the visual perceptual task,
- wherein in providing the second session, the controller is further configured to display the second Gabor patch at a location corresponding to the vision ability-changed region more frequently than at locations corresponding to remaining regions of the plurality of unit regions, and
- wherein: the vision ability-changed region comprises a first vision ability-changed region and a second vision ability-changed region, which have the same vision index; the user's vision ability in the first vision ability-changed region is changed during a first time period; the user's vision ability in the second vision ability-changed region is changed during a second time period, which is longer than the first time period; and in providing the second session, the controller is further configured to:
- display the second Gabor patch at a position corresponding to the first vision ability-changed region more frequently than at a position corresponding to the second vision ability-changed region.

12. The device of claim 11, wherein the response of the user is related to an attribute of the second Gabor patch, and
wherein the attributes of the second Gabor patch include at least one of existence or absence, contrast, size, shape, color, display time, brightness, movement, rotation, pattern, and depth.

13. The device of claim 11, wherein the response of the user is as to whether attributes of the first Gabor patch and the second Gabor patch are the same.

14. The device of claim 11, wherein the second Gabor patch is displayed more number of times at a second location corresponding to a second unit region in which a change in vision ability is larger than that of a first unit region, as compared to a first location corresponding to the first unit region among the user's vision ability-changed regions, and
wherein the first location is different from the second location.

15. The device of claim 11, wherein the vision ability-changed region includes at least one of a vision ability-improved region reflecting improvement of the user's vision ability and a vision ability-deteriorated region reflecting deterioration of the user's vision ability.

16. The device of claim 15, wherein the second Gabor patch in the second session is displayed more number of times at a location corresponding to the vision ability-deteriorated region, compared to at a location corresponding to the vision ability-improved region.

17. The device of claim 11, wherein the visual perceptual task requests an additional response related to the first Gabor patch from the user,
wherein the additional response relates to an attribute of the first Gabor patch, and
wherein the attributes of the first Gabor patch include at least one of existence or absence, contrast, size, shape, color, display time, brightness, movement, rotation, pattern, and depth.

18. The device of claim 11, wherein the controller is configured to provide an evaluation session using the visual perceptual task, and generate the visual field map based on the evaluation session when obtaining the visual field map, and wherein the visual field map is generated based on whether a response related to the second Gabor patch is correct in the evaluation session.

19. The device of claim 18, wherein the first vision index is assigned to a first unit region having a first correct rate with respect to a response related to the second Gabor patch, wherein a second vision index is assigned to a second unit region having a second correct rate greater than the first correct rate with respect to a response related to the second Gabor patch, and wherein the second vision index reflects a higher vision ability than the first vision index.

20. The device of claim 11, wherein the controller is further configured to:

increase difficulty of the visual perceptual task when the user's response related to the Gabor patch is correct or consecutively correct, by reducing difference in pattern directions of the Gabor patches, by reducing difference in rotation directions of the Gabor patches, or by reducing difference in depths of the Gabor patches, on the first display and the second display of the device.

* * * * *